(12) United States Patent
Fukuda et al.

(10) Patent No.: US 8,824,529 B2
(45) Date of Patent: Sep. 2, 2014

(54) SIGNAL TRANSMISSION SYSTEM, TRANSMITTING DEVICE, RECEIVING DEVICE, ELECTRONIC DEVICE, AND SIGNAL TRANSMISSION METHOD

(75) Inventors: Satoshi Fukuda, Tokyo (JP); Kenichi Kawasaki, Tokyo (JP); Satoru Shinke, Tokyo (JP)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 12/929,358

(22) Filed: Jan. 19, 2011

(65) Prior Publication Data

US 2011/0194627 A1 Aug. 11, 2011

(30) Foreign Application Priority Data

Feb. 10, 2010 (JP) ................................. 2010-027137

(51) Int. Cl.
*H04B 1/38* (2006.01)
*H04L 27/12* (2006.01)
*H04B 1/40* (2006.01)
*H01P 1/20* (2006.01)

(52) U.S. Cl.
CPC ............... *H04B 1/40* (2013.01); *Y10S 505/866* (2013.01); *Y10S 505/825* (2013.01)
USPC ........... 375/220; 375/219; 375/301; 375/300; 375/295; 455/41.2; 455/39; 455/90.3; 455/73; 455/128; 455/91; 505/866; 505/825

(58) Field of Classification Search
USPC ............... 455/76, 41.2, 39, 90.3, 73, 128, 91; 375/219, 220, 301, 300, 295; 505/866, 505/825
See application file for complete search history.

(56) References Cited

U.S. PATENT DOCUMENTS

| 4,962,316 | A | * | 10/1990 | Jack ........................... 250/336.2 |
| 4,995,053 | A | * | 2/1991 | Simpson et al. .............. 375/130 |
| 5,377,222 | A | * | 12/1994 | Sanderford, Jr. .............. 375/131 |
| 5,754,948 | A | | 5/1998 | Metze |

(Continued)

FOREIGN PATENT DOCUMENTS

| JP | 10-256478 A | 9/1998 |
| JP | 2005-204221 A | 7/2005 |
| JP | 2005-223411 A | 8/2005 |

OTHER PUBLICATIONS

Kornegay, Kevin, "60 Ghz Radio Design Challenges," 2003, IEEE, Gallium Arsenide Integrated Circuit (GaAS IC) Symposium, 25th Annual Technical Digest, pp. 89-92.*

(Continued)

*Primary Examiner* — Chieh M Fan
*Assistant Examiner* — Michelle M Koeth
(74) *Attorney, Agent, or Firm* — Rader, Fishman & Grauer PLLC

(57) ABSTRACT

A signal transmission system includes: a transmitting section including a first carrier signal generating section configured to generate a carrier signal for modulation and a first frequency converting section configured to generate a transmission signal by frequency-converting a transmission object signal by the carrier signal for modulation, the carrier signal for modulation being generated by the first carrier signal generating section; and a receiving section including a second carrier signal generating section configured to generate a carrier signal for demodulation and a second frequency converting section configured to frequency-convert the transmission signal received by the carrier signal for demodulation, the carrier signal for demodulation being generated by the second carrier signal generating section.

15 Claims, 14 Drawing Sheets

(56) References Cited

U.S. PATENT DOCUMENTS

| | | | |
|---|---|---|---|
| 6,111,911 A * | 8/2000 | Sanderford et al. | 375/147 |
| 6,433,905 B1 * | 8/2002 | Price et al. | 398/139 |
| 6,757,268 B1 * | 6/2004 | Zendle | 370/338 |
| 6,809,688 B2 * | 10/2004 | Yamada | 343/700 MS |
| 8,340,214 B2 * | 12/2012 | Kang et al. | 375/297 |
| 2005/0162338 A1 * | 7/2005 | Ikeda et al. | 345/2.1 |
| 2008/0001779 A1 * | 1/2008 | Cahill-O'Brien et al. | 340/870.03 |
| 2008/0004086 A1 * | 1/2008 | Rastegar et al. | 455/566 |
| 2009/0065582 A1 * | 3/2009 | Kon et al. | 235/439 |
| 2009/0124213 A1 * | 5/2009 | Rubin et al. | 455/76 |
| 2009/0257529 A1 * | 10/2009 | Popplewell et al. | 375/320 |
| 2009/0270037 A1 * | 10/2009 | Ikeda et al. | 455/41.3 |
| 2010/0061467 A1 * | 3/2010 | Ogiso | 375/257 |
| 2010/0093299 A1 * | 4/2010 | Pinel et al. | 455/226.1 |
| 2010/0102895 A1 * | 4/2010 | Beukema et al. | 332/103 |
| 2012/0082194 A1 * | 4/2012 | Tam et al. | 375/219 |
| 2013/0029598 A1 * | 1/2013 | Rofougaran | 455/41.1 |

OTHER PUBLICATIONS

McCullough, Andy, Designing a Wireless Network : Understand How Wireless Communication Works, May 2001, Syngress Publishing, pp. 27-28 and 59-60.*

Analog Devices, AD9850 Data Sheet, 2004, Analog Devices, p. 8.*

Smulders, Peter, "Exploiting the 60 Ghz Band for Local Wireless Multimedia Access: Prospects and Future Directions," Jan. 2002, IEEE Communications Magazine, p. 140.*

Raisanen, Antti V., Radio Engineering for wireless communication and sensor applications, 2003, Artech House Inc., p. 271.*

Wenjia Tang; Hongjoon Kim, "Low Spurious, Broadband Frequency Translator Using Left-Handed Nonlinear Transmission Line," Microwave and Wireless Components Letters, IEEE , vol. 19, No. 4, pp. 221,223, Apr. 2009.*

* cited by examiner

<SHIFTS OF Tx AND Rx WITH RESPECT TO CARRIER>

SIGNAL TRANSMISSION SYSTEM, TRANSMITTING DEVICE, RECEIVING DEVICE, ELECTRONIC DEVICE, AND SIGNAL TRANSMISSION METHOD

BACKGROUND OF THE INVENTION

1. Field of the Invention

The present invention relates to a signal transmission system, a transmitting device, a receiving device, an electronic device, and a signal transmission method, and particularly to a mechanism for achieving high-speed data communication.

2. Description of the Related Art

For example, LVDS (Low Voltage Differential Signaling) is known as a method for achieving high-speed signal transmission between electronic devices disposed at a relatively short distance (for example within a few centimeters to a few ten centimeters) from each other or within an electronic device. However, with recent further increases in volume and speed of transmission data, an increase in power consumption, an increase in effect of signal distortion due to reflection and the like, an increase in unwanted radiation, and the like become problems. For example, LVDS is reaching a limit in cases where a video signal (including an image pickup signal) or a signal of a computer image or the like is transmitted at high speed (in real time) within a device.

In order to make provision for high-speed transmission of data, it is conceivable that the number of pieces of wiring may be increased and that transmission speed per signal line may be decreased by signal parallelization. However, this provision increases input and output terminals. As a result, complication of a printed board and cable wiring, an increase in size of a semiconductor chip, and the like are demanded. In addition, so-called electromagnetic field interference becomes a problem as a result of routing high-speed and high-volume data by wiring.

The problems in LVDS and the method of increasing the number of pieces of wiring are each caused by transmitting signals by electric wiring. Accordingly, methods of making transmission by radio in place of electric wiring have been proposed as methods for solving the problems caused by transmitting signals by electric wiring (see Japanese Patent Laid-Open No. 2005-204221 (hereinafter referred to as Patent Document 1), Japanese Patent Laid-Open No. 2005-223411 (hereinafter referred to as Patent Document 2), Japanese Patent Laid-Open No. Hei 10-256478 (hereinafter referred to as Patent Document 3), and U.S. Pat. No. 5,754,948 (hereinafter referred to as Patent Document 4), for example).

SUMMARY OF THE INVENTION

Patent Document 1 and Patent Document 2 propose signal transmission within a casing by radio and application of a UWB (Ultra Wide Band) communication system. Patent Document 3 and Patent Document 4 disclose that a carrier frequency in a millimeter wave band of short wavelength (1 to 10 mm) is used.

However, the UWB communication system in Patent Document 1 and Patent Document 2, which uses low carrier frequency, is not suitable for high-speed communication such as transmission of a video signal, for example, and presents problems in terms of size such for example as an increase in antenna size. There is another problem in that interference tends to occur between a radio signal and a baseband signal because frequencies used for transmission are close to frequencies of other baseband signal processing. In addition, in the case of low carrier frequency, susceptibility to noise of a driving system within a device is increased, and thus provision therefor needs to be made.

When a carrier frequency in the millimeter wave band of shorter wavelength or a submillimeter wave band of even shorter wavelength (0.1 to 1 mm) is used as in Patent Document 3 and Patent Document 4, on the other hand, the problems of antenna size and interference can be solved.

There is a limit in terms of system configuration to widening the bandwidth of a transmitting system and a receiving system or to setting the use band of the carrier frequency to a band of shorter wavelength in order to increase the speed of transmission data.

While there is a desire for a method for achieving higher speed of transmission data without widening the bandwidth of the transmitting system or the receiving system or changing the use band of the carrier frequency, the desire has not been met in an actual situation.

The present invention has been made in view of the above-described situation. It is desirable to provide a novel mechanism for achieving higher speed of transmission data.

In one mode of the present invention, first, in a transmitting section, a carrier signal generating section generates a carrier signal for modulation, and a frequency converting section generates a transmission signal by frequency-converting a transmission object signal by the carrier signal for modulation. In a receiving section, a carrier signal generating section generates a carrier signal for demodulation, and a frequency converting section demodulates the transmission object signal by frequency-converting the transmission signal received by the carrier signal for demodulation.

At this time, in the present invention, the frequency of the carrier signal is set so as to be shifted with respect to a center of a band of a transmission characteristic between transmission and reception.

When the frequency of the carrier signal is set so as to be shifted with respect to the center of the band of the transmission characteristic between transmission and reception, it suffices to shift at least one of the carrier signal for modulation and the carrier signal for demodulation with respect to the center of the band of the transmission characteristic between transmission and reception. For example, either of a first method of setting only one of a center of a band of the transmitting section and a center of a band of the receiving section so as to be shifted with respect to the frequency of the carrier signal and a second method of setting both of a center of a band of the transmitting section and a center of a band of the receiving section so as to be shifted in a same direction with respect to the frequency of the carrier signal may be adopted.

As will be described in detail in embodiments, because the frequency of the carrier signal is set so as to be shifted with respect to the center of the band of the transmission characteristic between transmission and reception, wide-band transmission is made possible by the asymmetry of the transmission band with respect to the carrier signal. At this time, the substantial transmission band of each of a transmitting system and a receiving system is not widened.

According to one mode of the present invention, wide-band transmission can be made without widening the substantial transmission band of either of the transmitting system and the receiving system.

DETAILED DESCRIPTION OF PREFERRED EMBODIMENTS

Preferred embodiments of the present invention will hereinafter be described in detail with reference to the drawings.

Incidentally, description will be made in the following order.
1. Communication Processing System: Basics
2. Modulation and Demodulation: First Example (Basics of Synchronous Detection)
3. Modulation and Demodulation: Second Example (Application of Injection Locking System)
4. Basic Principles of Provision for Increasing Speed of Transmission Data
5. Simulation Analysis
6. Electronic Devices and Transmission Line Structures (within Casing and between Electronic Device and Loaded or Mounted Device)

<Communication Processing System: Basics>

Figure 1:
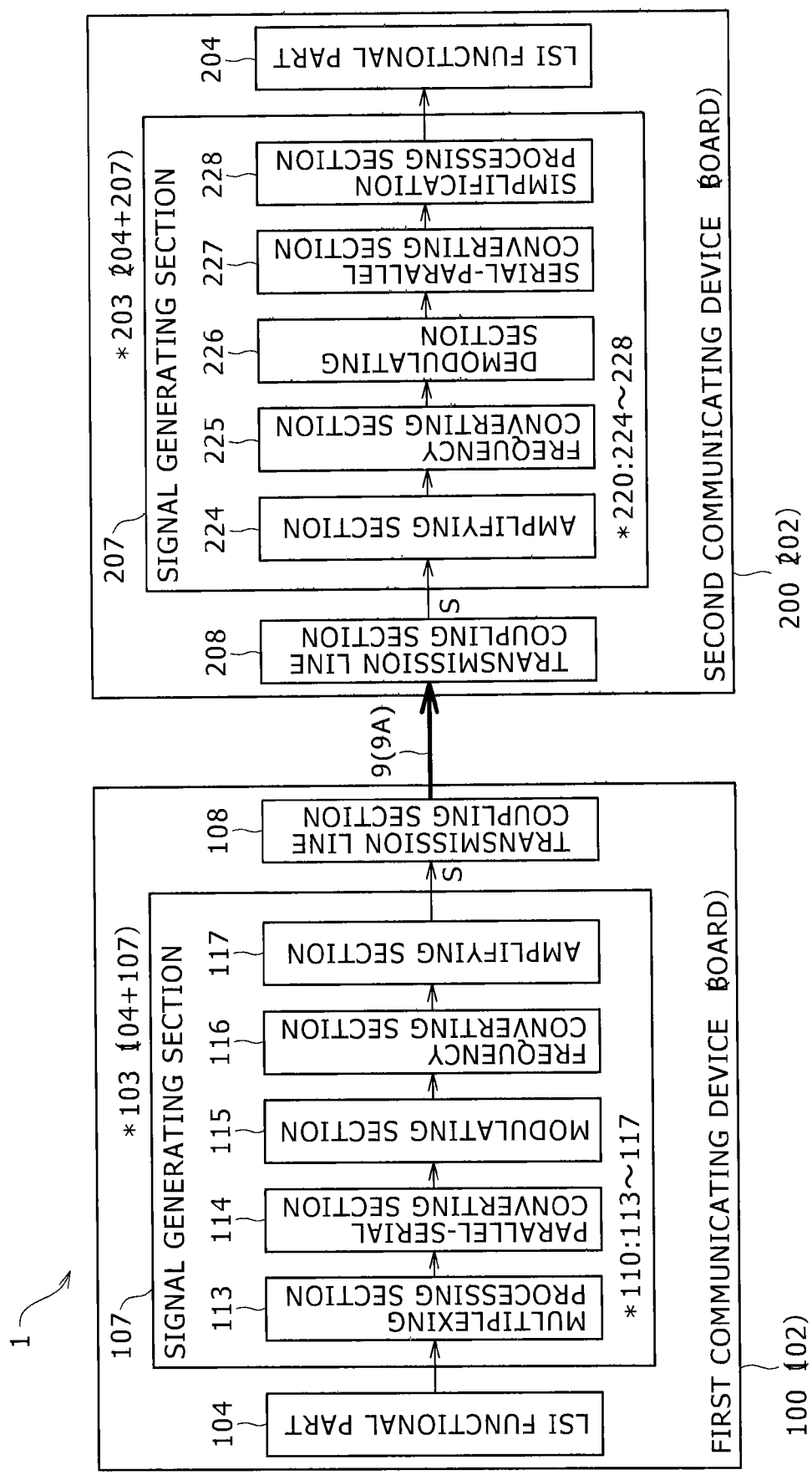
FIG. 1 is a diagram of assistance in explaining a signal interface of a radio transmission system according to a present embodiment from an aspect of a functional configuration.

FIG. 1 is a diagram of assistance in explaining a signal interface of a radio transmission system (signal transmission system) according to a present embodiment from an aspect of a functional configuration.

Description will be made assuming a millimeter wave band as carrier frequencies used in the radio transmission system according to the present embodiment. The radio transmission system according to the present embodiment is for example used in a digital recording and reproducing device, a terrestrial television receiving device, a portable telephone device, a game device, a computer or the like.

[Functional Configuration]

As shown in FIG. 1, the radio transmission system 1 is configured such that a first communicating device 100 as an example of a first radio device and a second communicating device 200 as an example of a second radio device are coupled to each other via a millimeter wave signal transmission line 9 and such that signals are transmitted in a millimeter wave band. The millimeter wave signal transmission line 9 is an example of a radio signal transmission line. In the present configuration, a signal as an object of transmission is transmitted after being frequency-converted to the millimeter wave band suitable for wide-band transmission.

A first communicating section (transmitting section: a first millimeter wave transmission device) and a second communicating section (receiving section: a second millimeter wave transmission device) form a radio transmission device (signal transmission system). Between the first communicating section and the second communicating section disposed at a relatively short distance from each other, a signal as an object of transmission is converted into a millimeter wave signal, and then the millimeter wave signal is transmitted via a millimeter wave signal transmission line. "Radio transmission" in the present embodiment means that a signal as an object of transmission is transmitted by radio (millimeter wave in this example) rather than ordinary electric wiring (simple wire wiring).

The "relatively short distance" means a shorter distance than a distance between communicating devices in the open air (outdoors) used in broadcasting or ordinary radio communication. It suffices for the relatively short distance to be such that a transmission range can be essentially identified as a closed space. The "closed space" means a space in which there is a small leakage of radio waves from the inside of the space to the outside, and conversely small amounts of radio waves come (penetrate) from the outside into the inside of the space. The closed space is typically in a state in which the space as a whole is enclosed by a casing (case) having a shielding effect on radio waves.

Communication in the present embodiment corresponds to for example communication between boards within a casing of one electronic device, communication between chips on a same board, and communication between a plurality of electronic devices in a state of the devices being integral with each other as in a state of one electronic device being loaded in another electronic device. A typical example of being "integral" is a state in which both electronic devices are in complete contact with each other as a result of loading. However, it suffices for the integral state to be such that a transmission range between both electronic devices can be essentially identified as a closed space. The integral state includes a case in which both electronic devices are disposed at determined positions in a state of being somewhat distant from each other at a relatively short distance such for example as within a few centimeters to a few ten centimeters of each other, and can be considered to be "essentially" integral with each other. In short, it suffices for the integral state to be a state in which there is a small leakage of radio waves from the inside of a space formed by both electronic devices and allowing radio waves to propagate through the space to the outside, and conversely small amounts of radio waves come (penetrate) from the outside into the inside of the space.

In the following, signal transmission within a casing of one electronic device will be referred to as intra-casing signal transmission, and signal transmission in a state of a plurality of electronic devices being integral (being integral hereinafter includes being "essentially integral") with each other will be referred to as inter-device signal transmission. In the case of intra-casing signal transmission, a radio transmission system in which a communicating device on a transmitting side (communicating section: a transmitting section) and a communicating device on a receiving side (communicating section: a receiving section) are housed within a same casing, and a radio signal transmission line is formed between the communicating sections (the transmitting section and the receiving section) is an electronic device itself. On the other hand, in the case of inter-device signal transmission, a communicating device on a transmitting side (communicating section: a transmitting section) and a communicating device on a receiving side (communicating section: a receiving section) are housed within casings of respective different electronic devices, and when both electronic devices are disposed at determined positions and thereby become integral with each other, a radio signal transmission line is formed between the communicating sections (the transmitting section and the receiving section) within both electronic devices, whereby a radio transmission system is constructed.

A transmitting system and a receiving system are combined and arranged as a pair in each of the communicating devices disposed with a millimeter wave signal transmission line interposed between the communicating devices. Bidirectional communication can be performed by making a transmitting system and a receiving system coexist in each of the communicating devices. When a transmitting system and a receiving system are made to coexist in each of the communicating devices, signal transmission between one communicating device and the other communicating device may be unidirectional (one direction) signal transmission, or may be bidirectional signal transmission.

FIG. 1 represents a case in which a transmitting system is provided on the side of the first communicating device 100, and a receiving system is provided to the second communicating device 200.

Suppose that the transmitting section includes for example a signal generating section on the transmitting side for generating a millimeter wave signal by subjecting a signal as an object of transmission to signal processing (signal converting section for converting an electric signal as an object of transmission into a millimeter wave signal) and a signal coupling section on the transmitting side for coupling the millimeter wave signal generated by the signal generating section on the transmitting side to a transmission line for transmitting the millimeter wave signal (millimeter wave signal transmission line). Preferably, the signal generating section on the transmitting side is integral with a functional part for generating the transmission object signal.

For example, the signal generating section on the transmitting side has a modulating circuit. The modulating circuit modulates the transmission object signal. The signal generating section on the transmitting side generates the millimeter wave signal by frequency-converting the signal after being modulated by the modulating circuit. Theoretically, the transmission object signal may also be directly converted into the millimeter wave signal. The signal coupling section on the transmitting side supplies the millimeter wave signal generated by the signal generating section on the transmitting side to the millimeter wave signal transmission line.

Suppose that the receiving section includes for example a signal coupling section on the receiving side for receiving the millimeter wave signal transmitted via the millimeter wave signal transmission line and a signal generating section on the receiving side for generating an ordinary electric signal (transmission object signal) by subjecting the millimeter wave signal (input signal) received by the signal coupling section on the receiving side to signal processing (signal converting section for converting the millimeter wave signal to the transmission object electric signal). Preferably, the signal generating section on the receiving side is integral with a functional part for receiving the transmission object signal. For example, the signal generating section on the receiving side has a demodulating circuit. The millimeter wave signal is frequency-converted to generate an output signal. The demodulating circuit then demodulates the output signal, whereby the transmission object signal is generated. Theoretically, the millimeter wave signal may also be directly converted into the transmission object signal.

That is, in providing a signal interface, the transmission object signal is converted into the millimeter wave signal, and the millimeter wave signal is transmitted without contacts or cables (not transmitted by electric wiring). Preferably, at least signals (a video signal, a high-speed clock signal and the like that need high-speed transmission or high-capacity transmission in particular) are transmitted in the form of the millimeter wave signal. In short, signal transmission hitherto performed by electric wiring is performed by the millimeter wave signal in the present embodiment. By performing signal transmission in the millimeter wave band, it is possible to achieve high-speed signal transmission on the order of Gbps, limit a range covered by the millimeter wave signal, and obtain effects resulting from this nature.

In this case, it suffices for each signal coupling section to allow the first communicating section and the second communicating section to transmit a millimeter wave signal via the millimeter wave signal transmission line. For example, each signal coupling section may have an antenna structure (antenna coupling section), or may achieve coupling without having an antenna structure.

The "millimeter wave signal transmission line for transmitting the millimeter wave signal" may be an air (so-called free space), but preferably has a structure that transmits the millimeter wave signal while confining the millimeter wave signal in the transmission line. By actively utilizing the nature, the routing of the millimeter wave signal transmission line can be determined arbitrarily as by electric wiring, for example.

The millimeter wave signal transmission line of such a structure typically includes a so-called waveguide, but is not limited to this. For example, the millimeter wave signal transmission line is preferably a millimeter wave signal transmission line formed by a dielectric material capable of millimeter wave signal transmission (which transmission line will be referred to as a dielectric transmission line or a millimeter wave intra-dielectric transmission line) or a hollow waveguide forming a transmission line and provided with a shielding material for suppressing external radiation of the millimeter wave signal, the shielding material being provided so as to enclose the transmission line, and the inside of the shielding material being hollow. The millimeter wave signal transmission line can be routed by imparting flexibility to the dielectric material or the shielding material.

In the case of an air (free space), each signal coupling section has an antenna structure, and signals are transmitted in the short-range space by the antenna structures. On the other hand, when the millimeter wave signal transmission line is formed by a dielectric material, an antenna structure may be adopted, but is not essential.

In the following, a mechanism of the radio transmission system 1 according to the present embodiment will be described concretely. Incidentally, an example in which each functional part is formed on a semiconductor integrated circuit (chip) will be described as a most suitable example, but this is not essential.

The first communicating device 100 is provided with a semiconductor chip 103 ready for millimeter wave band transmission. The second communicating device 200 is provided with a semiconductor chip 203 ready for millimeter wave band reception.

In the present embodiment, signals as objects of communication in the millimeter wave band are only signals desired to have a high-speed characteristic and a high-capacity characteristic, and other signals that need only a low speed and a low capacity and signals that can be considered to be a direct current such as power and the like are not set as objects for conversion into a millimeter wave signal. For the signals (including power) not set as objects for conversion into a millimeter wave signal, signal connection between boards is established by a mechanism similar to an existing mechanism. Electric signals as original objects of transmission before conversion into millimeter waves will be referred to collectively as baseband signals.

[First Communicating Device]

The semiconductor chip 103 and a transmission line coupling section 108 ready for millimeter wave band transmission are mounted on a board 102 of the first communicating device 100. The semiconductor chip 103 is a system LSI (Large Scale Integrated Circuit) into which an LSI functional part 104 and a signal generating section 107 (millimeter wave signal generating section) are integrated.

The semiconductor chip 103 is connected with the transmission line coupling section 108. For example an antenna structure including an antenna coupling section, an antenna terminal, a microstrip line, an antenna and the like is applied to the transmission line coupling section 108.

The LSI functional part 104 performs main application control in the first communicating device 100. The LSI functional part 104 for example includes a circuit for processing various signals desired to be transmitted to the other device.

The signal generating section 107 (electric signal converting section) has a transmitting side signal generating section 110 for converting a signal from the LSI functional part 104 into a millimeter wave signal and controlling signal transmission via the millimeter wave signal transmission line 9. The transmitting side signal generating section 110 and the transmission line coupling section 108 form a transmitting system (transmitting section: the communicating section on the transmitting side).

In order to generate a millimeter wave signal by processing an input signal, the transmitting side signal generating section 110 has a multiplexing processing section 113, a parallel-serial converting section 114, a modulating section 115, a frequency converting section 116, and an amplifying section 117. Incidentally, the modulating section 115 and the frequency converting section 116 may be integrated into a section of a so-called direct conversion system.

The parallel-serial converting section 114 is provided for parallel interface specifications using a plurality of signals for parallel transmission in a case where the present embodiment is not applied. The parallel-serial converting section 114 is not necessary in a case of serial interface specifications.

When there are a plurality of (N1) kinds of signals as objects for communication in the millimeter wave band among signals from the LSI functional part 104, the multiplexing processing section 113 integrates the plurality of kinds of signals into a signal of one system by performing multiplexing processing such as time division multiplexing, frequency division multiplexing, code division multiplexing or the like. For example, a plurality of kinds of signals desired to have a high-speed characteristic and a high-capacity characteristic are set as objects for transmission by a millimeter wave, and integrated into a signal of one system.

The parallel-serial converting section 114 converts parallel signals into a serial data signal, and supplies the serial data signal to the modulating section 115. The modulating section 115 modulates the signal as an object for transmission, and supplies the modulated signal to the frequency converting section 116.

It basically suffices for the modulating section 115 to modulate at least one of amplitude, frequency, and phase by the transmission object signal, and systems using arbitrary combinations of amplitude, frequency, and phase can be adopted. For example, an analog modulating system includes amplitude modulation (AM) and vector modulation. Vector modulation includes frequency modulation (FM) and phase modulation (PM). A digital modulating system includes for example amplitude shift keying (ASK), frequency shift keying (FSK), phase shift keying (PSK), and amplitude phase shift keying (APSK) that modulates amplitude and phase. Quadrature amplitude modulation (QAM) typifies the amplitude phase shift keying. A system that makes it possible to adopt a synchronous detection system on the receiving side, in particular, is adopted in the present embodiment.

The frequency converting section 116 generates a millimeter wave electric signal by frequency-converting the transmission object signal after being modulated by the modulating section 115, and then supplies the millimeter wave electric signal to the amplifying section 117. The millimeter wave electric signal refers to an electric signal of a certain frequency in a range of approximately 30 GHz to 300 GHz. The word "approximately" is used on the basis of a fact that it suffices for the frequency to be about such a frequency as to provide an effect of millimeter wave communication, with a lower limit not limited to 30 GHz and an upper limit not limited to 300 GHz.

The frequency converting section 116 can employ various circuit configurations. However, for example, it suffices for the frequency converting section 116 to employ a configuration including a frequency mixing circuit (mixer circuit) and a local oscillating circuit. The local oscillating circuit generates a carrier wave (a carrier signal or a reference carrier wave) used for modulation. The frequency mixing circuit generates a transmission signal in the millimeter wave band by multiplying (modulating) the carrier wave in the millimeter wave band which carrier wave is generated by the local oscillating circuit by the signal from the parallel-serial converting section 114. The frequency mixing circuit then supplies the transmission signal to the amplifying section 117.

The amplifying section 117 amplifies the millimeter wave electric signal after the frequency conversion, and then supplies the amplified millimeter wave electric signal to the transmission line coupling section 108. The amplifying section 117 is connected to the bidirectional transmission line coupling section 108 via an antenna terminal not shown in the figure.

The transmission line coupling section 108 transmits the millimeter wave signal generated by the transmitting side signal generating section 110 to the millimeter wave signal transmission line 9.

The transmission line coupling section 108 is formed by an antenna coupling section. The antenna coupling section forms an example or a part of the transmission line coupling section 108 (signal coupling section). The antenna coupling section in a narrow sense refers to a part for coupling an electronic circuit within a semiconductor chip to an antenna disposed within the chip or outside the chip, and in a broad sense refers to a part for signal coupling of the semiconductor chip to the millimeter wave signal transmission line 9.

For example, the antenna coupling section has at least an antenna structure. The antenna structure refers to a structure in a section for coupling to the millimeter wave signal transmission line 9. It suffices for the antenna structure to couple an electric signal in the millimeter wave band to the millimeter wave signal transmission line 9, and the antenna structure does not mean only an antenna itself.

The millimeter wave signal transmission line 9 as a millimeter wave propagation path may for example be formed so as to propagate millimeter waves in a space within a casing, for example, as a free space transmission line. In addition, it is desirable that the millimeter wave signal transmission line 9 be formed by a waveguide, a transmission line, a dielectric line, or a waveguide structure within a dielectric or the like, formed so as to confine an electromagnetic wave in the millimeter wave band within a transmission line, and have a characteristic of transmitting the electromagnetic wave efficiently.

For example, the millimeter wave signal transmission line 9 is desirably a dielectric transmission line 9A including a dielectric material having a relative dielectric constant in a certain range and a dielectric loss tangent in a certain range. For example, by filling the dielectric material into the whole of the inside of the casing, the dielectric transmission line 9A, rather than the free space transmission line, is disposed between the transmission line coupling section 108 and a transmission line coupling section 208. In addition, the dielectric transmission line 9A may be formed by making connection between the antenna of the transmission line coupling section 108 and the antenna of the transmission line coupling section 208 by a dielectric line as a linear member formed by a dielectric material and having a certain line diameter. Incidentally, the millimeter wave signal transmission line 9 formed so as to confine a millimeter wave signal in the transmission line may not only be the dielectric transmission line 9A but also be a hollow waveguide whose periphery is surrounded by a shielding material and whose inside is hollow.

[Second Communicating Device]

The semiconductor chip 203 and the transmission line coupling section 208 ready for millimeter wave band reception are mounted on a board 202 of the second communicating device 200. The semiconductor chip 203 is a system LSI into which an LSI functional part 204 and a signal generating section 207 (millimeter wave signal generating section) are integrated. Though not shown, as in the first communicating device 100, a configuration in which the LSI functional part 204 and the signal generating section 207 are not integrated with each other may also be adopted.

The semiconductor chip 203 is connected with the transmission line coupling section 208 similar to the transmission line coupling section 108. The transmission line coupling section 208 receives a millimeter wave signal from the millimeter wave signal transmission line 9, and outputs the millimeter wave signal to a receiving side signal generating section 220.

The signal generating section 207 (electric signal converting section) has the receiving side signal generating section 220 for controlling signal reception via the millimeter wave signal transmission line 9. The receiving side signal generating section 220 and the transmission line coupling section 208 form a receiving system (receiving section: the communicating section on the receiving side).

In order to generate an output signal by subjecting the millimeter wave electric signal received by the transmission line coupling section 208 to signal processing, the receiving side signal generating section 220 has an amplifying sections 224, a frequency converting section 225, a demodulating section 226, a serial-parallel converting section 227, and a simplification processing section 228. The frequency converting section 225 and the demodulating section 226 may be integrated into a section of a so-called direct conversion system.

The transmission line coupling section 208 is connected with the receiving side signal generating section 220. The amplifying sections 224 on the receiving side is connected to the transmission line coupling section 208. The amplifying sections 224 amplifies the millimeter wave electric signal after being received by an antenna, and then supplies the millimeter wave electric signal to the frequency converting section 225. The frequency converting section 225 frequency-converts the millimeter wave electric signal after the amplification, and then supplies the signal after the frequency conversion to the demodulating section 226. The demodulating section 226 obtains a baseband signal by demodulating the signal after the frequency conversion, and then supplies the baseband signal to the serial-parallel converting section 227.

The serial-parallel converting section 227 converts serial received data to parallel output data, and then supplies the parallel output data to the simplification processing section 228. As with the parallel-serial converting section 114, the serial-parallel converting section 227 is provided for the parallel interface specifications using a plurality of signals for parallel transmission in a case where the present embodiment is not applied.

When original signal transmission between the first communicating device 100 and the second communicating device 200 is in a parallel form, the number of signals as objects of millimeter wave conversion is reduced by subjecting an input signal to parallel-serial conversion and then transmitting the signal to the semiconductor chip 203 side, and subjecting the signal received from the semiconductor chip 103 side to serial-parallel conversion.

When original signal transmission between the first communicating device 100 and the second communicating device 200 is in a serial form, the parallel-serial converting section 114 and the serial-parallel converting section 227 do not need to be provided.

The simplification processing section 228 corresponds to the multiplexing processing section 113. The simplification processing section 228 separates the signal integrated in one system into a plurality of kinds of signals_@ (@ is 1 to N). For example, the simplification processing section 228 separates the plurality of data signals integrated in the signal of one system into each separate data signal, and then supplies each separate data signal to the LSI functional part 204.

The LSI functional part 204 performs main application control in the second communicating device 200. The LSI functional part 204 for example includes a circuit for processing various signals received from the other device.

[Provision for Bidirectional Communication]

The signal generating section 107, the transmission line coupling section 108, the signal generating section 207, and the transmission line coupling section 208 are also capable of bidirectional communication by being configured to have data bidirectionality. For example, the signal generating section 107 and the signal generating section 207 are each provided with a signal generating section on a transmitting side and a signal generating section on a receiving side. While the transmission line coupling section 108 and the transmission line coupling section 208 may be each divided into separate parts on the transmitting side and the receiving side, the transmission line coupling section 108 and the transmission line coupling section 208 may also be shared for both transmission and reception.

Incidentally, "bidirectional communication" in this case is single-core bidirectional transmission where the millimeter wave signal transmission line 9 as a millimeter wave transmission channel is one system (one core). In order to realize this, a half-duplex system to which time division multiplexing (TDD: Time Division Duplex) is applied, frequency division multiplexing (FDD: Frequency Division Duplex) or the like is applied.

[Connection and Operation]

A method of frequency-converting an input signal and making signal transmission is commonly used in broadcasting and radio communications. In these applications, relatively complex transmitters and receivers and the like are used which can deal with problems of how far communication can be attained (problem of S/N with respect to thermal noise), how to cope with reflection and multiple paths, and how to suppress disturbance and interference with other channels, for example.

On the other hand, the signal generating section 107 and the signal generating section 207 used in the present embodiment are used in the millimeter wave band of a higher frequency band than usable frequencies of complex transmitters and receivers and the like commonly used in broadcasting and radio communication. Because of short wavelength λ, frequency reuse is easily made, and signal generating sections suitable for performing communication between many devices arranged in proximity to each other are used.

In the present embodiment, unlike a signal interface using existing electric wiring, provision can be made flexibly for high speed and high capacity by making signal transmission in the millimeter wave band, as described above. For example, only signals desired to have a high-speed characteristic and a high-capacity characteristic are set as objects for communication in the millimeter wave band, and depending on a system configuration, the first communicating device 100 and the second communicating device 200 have, in a part thereof, an interface (connection by a terminal or a connector) using existing electric wiring for low-speed and low-capacity signals and for power supply.

The signal generating section 107 generates a millimeter wave signal by subjecting an input signal input from the LSI functional part 104 to signal processing. The signal generating section 107 is connected to the transmission line coupling section 108 by a transmission line such as a microstrip line, a strip line, a coplanar line, or a slot line, for example. The generated millimeter wave signal is supplied to the millimeter wave signal transmission line 9 via the transmission line coupling section 108.

The transmission line coupling section 108 has an antenna structure. The transmission line coupling section 108 has a function of converting the transmitted millimeter wave signal into an electromagnetic wave and sending out the electromagnetic wave. The transmission line coupling section 108 is coupled to the millimeter wave signal transmission line 9. The electromagnetic wave converted by the transmission line coupling section 108 is supplied to one end part of the millimeter wave signal transmission line 9. The transmission line coupling section 208 on the side of the second communicating device 200 is coupled to another end of the millimeter wave signal transmission line 9. By providing the millimeter wave signal transmission line 9 between the transmission line coupling section 108 on the side of the first communicating device 100 and the transmission line coupling section 208 on the side of the second communicating device 200, the electromagnetic wave in the millimeter wave band propagates through the millimeter wave signal transmission line 9.

The transmission line coupling section 208 on the side of the second communicating device 200 is coupled to the millimeter wave signal transmission line 9. The transmission line coupling section 208 receives the electromagnetic wave transmitted to the other end of the millimeter wave signal transmission line 9, converts the electromagnetic wave into a millimeter wave signal, and then supplies the millimeter wave signal to the signal generating section 207 (baseband signal generating section). The signal generating section 207 subjects the converted millimeter wave signal to signal processing, thereby generates an output signal (baseband signal), and then supplies the output signal to the LSI functional part 204.

The above description has been made of a case of signal transmission from the first communicating device 100 to the second communicating device 200. However, when the first communicating device 100 and the second communicating device 200 are both configured to be capable of bidirectional communication, it suffices to similarly consider a case of transmitting a signal from the LSI functional part 204 of the second communicating device 200 to the first communicating device 100, and millimeter wave signals can be transmitted bidirectionally.

<Modulation and Demodulation: First Example>

Figure 2A:
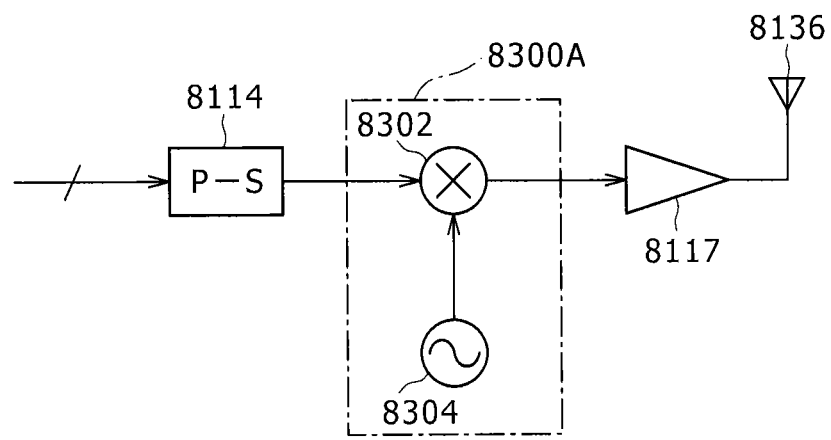
FIGS. 2A and 2B are diagrams of assistance in explaining a first example of a modulation functional part and a demodulation functional part.
Figure 2B:
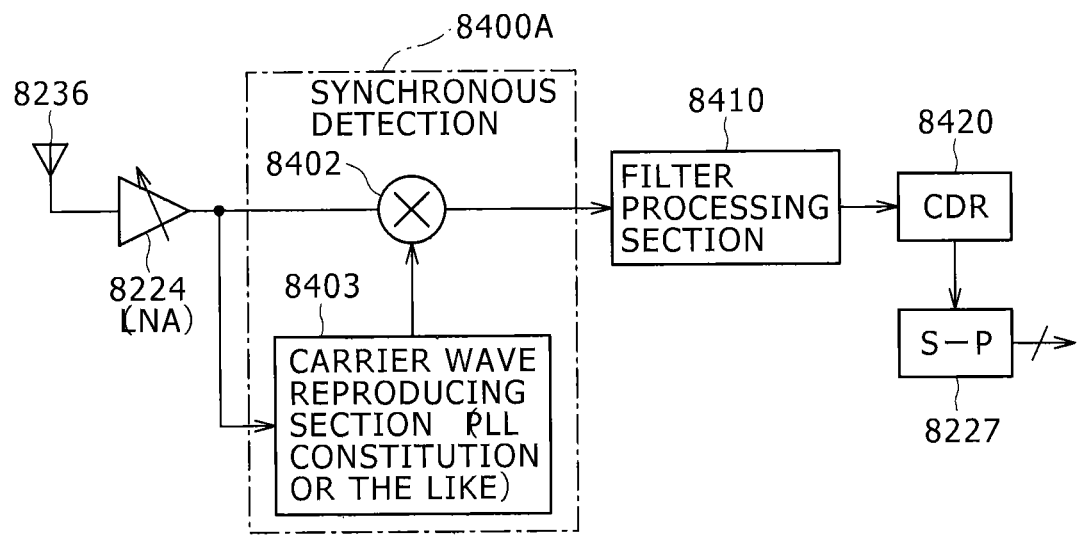

FIGS. 2A and 2B are diagrams of assistance in explaining a first example of a modulation functional part and a demodulation functional part.

<Modulation Functional Part: First Example>

FIG. 2A shows a configuration of the modulation functional part 8300A in the first example which functional part is provided on the transmitting side. A transmission object signal (baseband signal: for example a 12-bit image signal) is converted into a high-speed serial data series by a parallel-serial converting section 8114 (P-S: corresponding to the parallel-serial converting section 114). The serial data series is supplied to the modulation functional part 8300A. The modulation functional part 8300A sets the signal from the parallel-serial converting section 8114 as a modulating signal, and modulates the modulating signal into a signal in the millimeter wave band according to a predetermined modulating system.

The modulation functional part 8300A can adopt various circuit configurations according to the modulating system. When the modulating system modulates amplitude, for example, it suffices to adopt a configuration having a two-input type frequency mixing section 8302 (a mixer circuit or a multiplier) and a transmitting side local oscillating section 8304.

The transmitting side local oscillating section 8304 (first carrier signal generating section) generates a carrier signal used for modulation (modulation carrier signal). The frequency mixing section 8302 (first frequency converting section) generates a transmission signal (modulated signal) in the millimeter wave band by multiplying (modulating) a carrier wave in the millimeter wave band which carrier wave is generated by the transmitting side local oscillating section 8304 by the signal from the parallel-serial converting section 8114. The frequency mixing section 8302 then supplies the transmission signal to an amplifying section 8117 (corresponding to the amplifying section 117). The transmission signal is amplified by the amplifying section 8117, and then radiated from an antenna 8136.

[Demodulation Functional Part: First Example]

FIG. 2B shows a configuration of the demodulation functional part 8400A in the first example which functional part is provided on the receiving side. The demodulation functional part 8400A can employ various circuit configurations in a range corresponding to the modulating system on the transmitting side. In this case, however, a system in which amplitude is modulated will be described so as to correspond to the foregoing description of the modulation functional part 8300A.

The demodulation functional part 8400A in the first example has a two-input type frequency mixing section 8402 (a mixing circuit or a multiplier) and a carrier wave reproducing section 8403. The demodulation functional part 8400A performs demodulation by a so-called synchronous detection system. In the synchronous detection system, a carrier wave included in a received signal is reproduced by the carrier wave reproducing section 8403 separate from the frequency mixing circuit 8402, and demodulation is performed using the reproduced carrier wave.

While various configurations are conceivable for the carrier wave reproducing section 8403, the first example adopts one of a system that generates a line spectrum coinciding with carrier frequency and which reproduces the carrier wave by inputting the line spectrum to a resonant circuit or a phase-locked loop (PLL) circuit, a system of frequency multiplication, and a system of reverse modulation.

The carrier wave reproducing section 8403 extracts a carrier signal for demodulation (demodulation carrier signal, which will be referred to as a reproduced carrier signal) which carrier signal perfectly coincides with the frequency and phase of the carrier wave on the transmitting side, that is, which carrier signal is synchronized in frequency and synchronized in phase. The carrier wave reproducing section 8403 supplies the carrier signal to the frequency mixing circuit 8402. The frequency mixing circuit 8402 multiples the reproduced carrier wave and the received signal together. The multiplication output includes a modulating signal component (baseband signal) as a transmission object signal component and a harmonic component (and a direct-current component in some cases).

In the example shown in FIG. 2B, a filter processing section 8410, a clock reproducing section 8420 (CDR: Clock Data Recovery), and a serial-parallel converting section 8227 (S-P: corresponding to the serial-parallel converting section 227) are provided in a stage subsequent to the frequency mixing circuit 8402. A low-pass filter (LPF), for example, is provided in the filter processing section 8410 to remove the harmonic component included in the multiplication output.

A millimeter wave received signal received by an antenna 8236 is input to an amplifying section 8224 (corresponding to the amplifying sections 224: LNA) of a variable gain type and a low noise type to be adjusted in amplitude, and then supplied to the demodulation functional part 8400A. The received signal adjusted in amplitude is input to the frequency mixing circuit 8402 and the carrier wave reproducing section 8403. The frequency mixing circuit 8402 generates a multiplication signal by synchronous detection as described above, and then supplies the multiplication signal to the filter processing section 8410. The high-frequency component of the multiplication signal generated by the frequency mixing circuit 8402 is removed by the low-pass filter of the filter processing section 8410, whereby the waveform (baseband signal) of the input signal sent from the transmitting side is generated. The baseband signal is supplied to the clock reproducing section 8420.

The clock reproducing section 8420 (CDR) reproduces a sampling clock on the basis of the baseband signal, samples the baseband signal with the reproduced sampling clock, and thereby generates a received data series. The generated received data series is supplied to the serial-parallel converting section 8227 (S-P), where a parallel signal (for example a 12-bit image signal) is reproduced. While there are various systems for reproducing the clock, a symbol synchronization system, for example, is adopted.

[Problems of First Example]

There are difficulties as follows when a radio transmission system is formed by the modulation functional part 8300A and the demodulation functional part 8400A in the first example.

First, the resonant circuit has difficulties as follows. For example, in field (outdoor) communication, realization of multiple channels needs to be considered. In this case, because of susceptibility to a frequency variation component of the carrier wave, strict specifications are demanded for stability of the carrier wave on the transmitting side. When an ordinary method as used in outdoor radio communication is to be used on the transmitting side and the receiving side in transmitting data by the millimeter wave in intra-casing signal transmission or inter-device signal transmission, stability is demanded of the carrier wave, and a highly stable millimeter wave oscillating circuit whose frequency stability is on the order of ppm (parts per million) is demanded.

It is conceivable that to realize a carrier signal of high frequency stability, a highly stable millimeter wave oscillating circuit may be realized on a silicon integrated circuit (CMOS: Complementary Metal-Oxide Semiconductor), for example. In a case of a typical LC oscillating circuit used in an ordinary CMOS process, a silicon substrate has a low insulating capability, and wiring forming an inductor is thin as compared with a discrete part. Thus, a tank circuit having a high Q-value (Quality Factor) cannot be formed easily, and is not realized easily. For example, when an inductance is formed on a CMOS chip, the Q-value is about 30 to 40.

Thus, in order to realize an oscillating circuit of high stability, a method may be adopted for example in which a tank circuit having a high Q-value is provided by a quartz oscillator or the like on the outside of the CMOS where the main body part of the oscillating circuit is formed, the tank circuit is made to oscillate at a low frequency, and the frequency is raised to the millimeter wave band by multiplying the oscillating output of the tank circuit. However, it is not desirable to provide such an external tank to all chips for a purpose of realizing a function that replaces signal transmission by wiring for LVDS (Low Voltage Differential Signaling) or the like with signal transmission by millimeter waves.

It is conceivable that a highly stable frequency multiplying circuit, a PLL circuit or the like may be used as another method for realizing a carrier signal of high frequency stability. However, this method increases circuit scale.

<Modulation and Demodulation: Second Example>

Figure 3A:
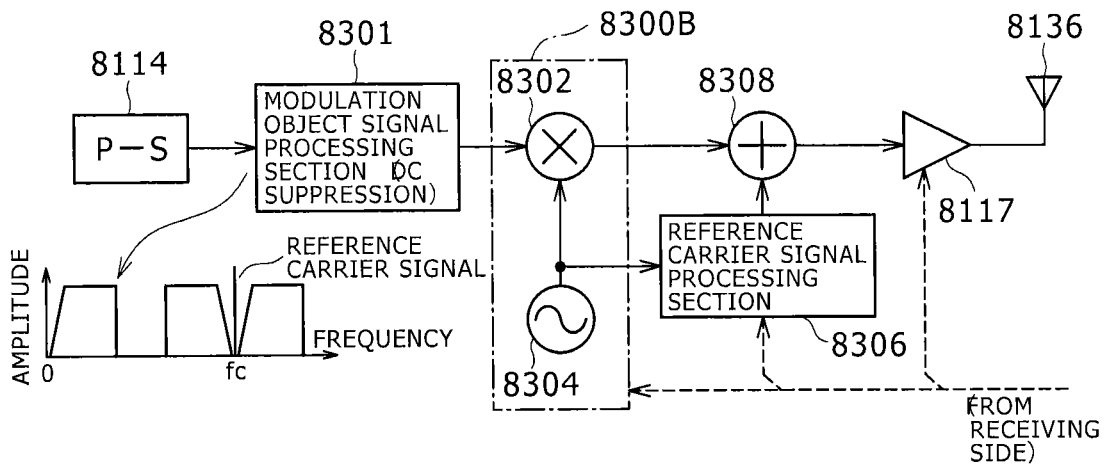
FIGS. 3A, 3B, and 3C are diagrams of assistance in explaining a second example of the modulation functional part (and a peripheral circuit of the modulation functional part)
Figure 3B:
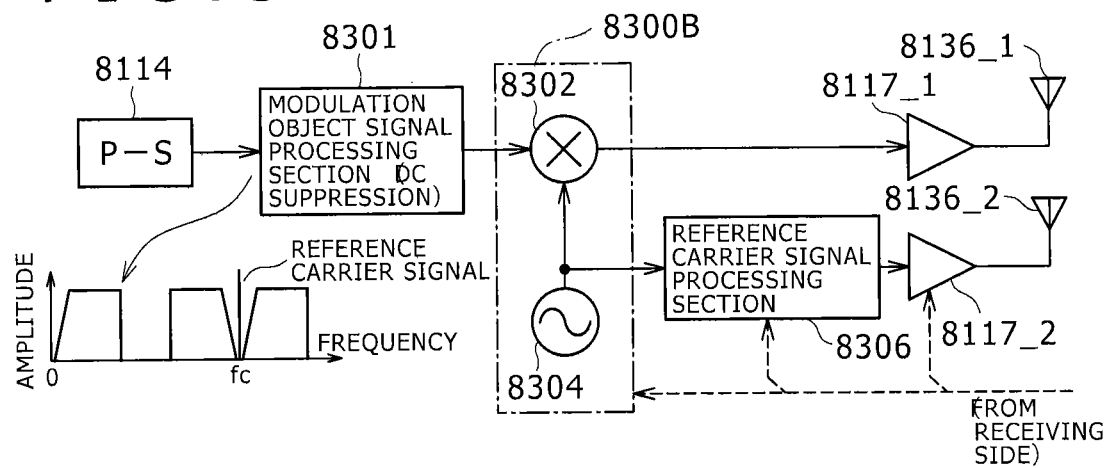
Figure 3C:
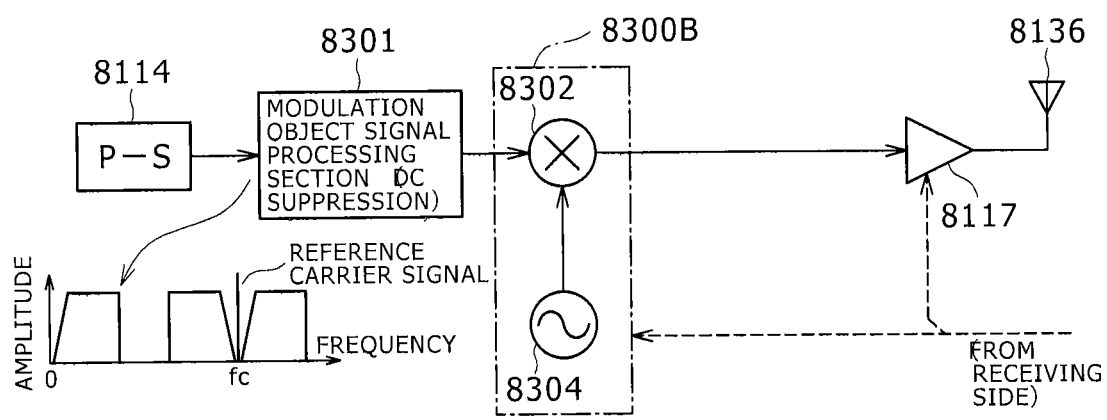
Figure 4A:
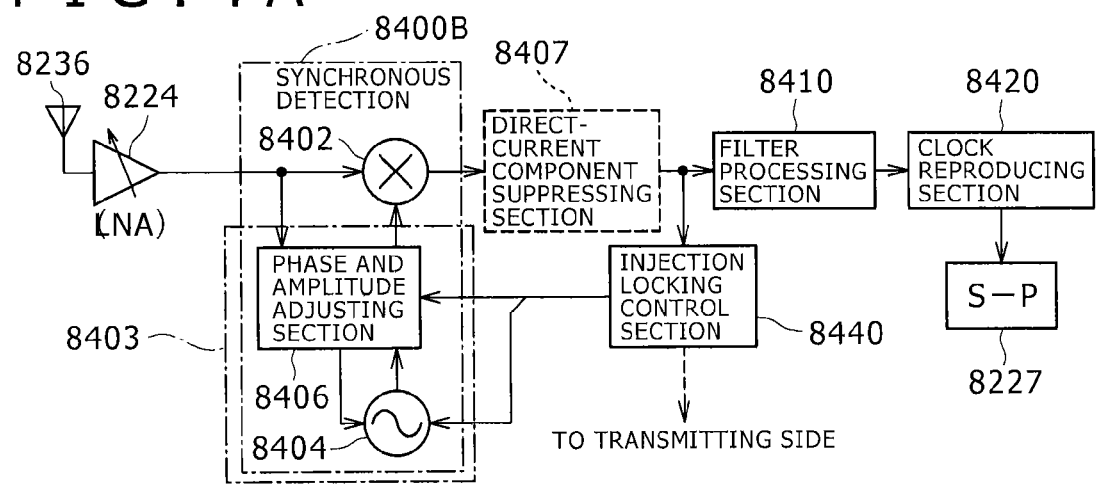
FIGS. 4A, 4B, and 4C are diagrams of assistance in explaining a second example of the demodulation functional part (and a peripheral circuit of the demodulation functional part)
Figure 4B:
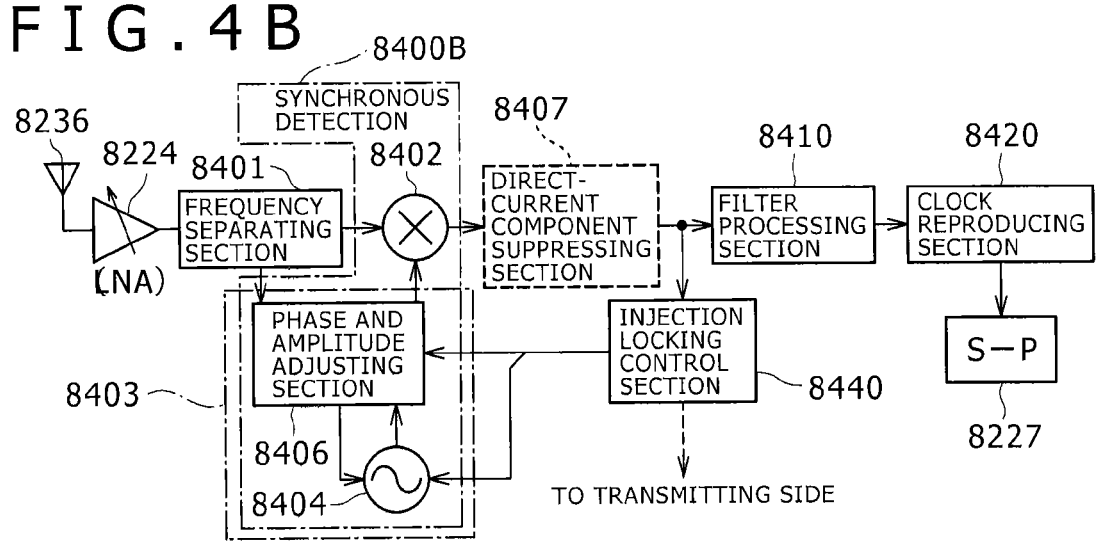
Figure 4C:
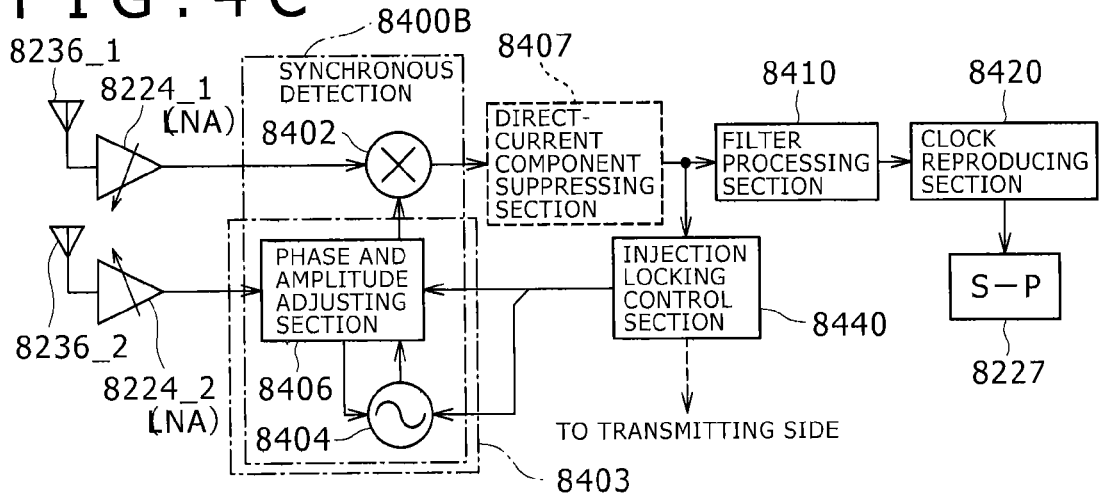

FIGS. 3A to 4C are diagrams of assistance in explaining a second example of the modulation functional part and the demodulation functional part. FIGS. 3A to 3C are diagrams of assistance in explaining examples of basic configuration of a transmitting side signal generating section 110 (communicating section on the transmitting side) formed by a modulation functional part 8300B (the modulating section 115 and the frequency converting section 116) in the second example which functional part is provided on the transmitting side and a peripheral circuit of the modulation functional part 8300B. FIGS. 4A to 4C are diagrams of assistance in explaining examples of basic configuration of a receiving side signal generating section 220 (communicating section on the receiving side) formed by a demodulation functional part 8400B (the frequency converting section 225 and the demodulating section 226) in the second example which functional part is provided on the receiving side and a peripheral circuit of the demodulation functional part 8400B.

In order to deal with the problems in the first example described above, the demodulation functional part 8400B in the second example employs an injection locking system. By using the injection locking system as carrier wave synchronizing means, a simple and low-power-consumption circuit can be formed.

In the case of the injection locking system, a modulation object signal is preferably subjected to appropriate correction processing in advance in order to facilitate injection locking on the receiving side. Typically, the modulation object signal is modulated after a component in the vicinity of a direct current of the modulation object signal is suppressed, that is, the modulation object signal is modulated after a low-frequency component around the DC (direct current) is suppressed (cut). Thereby, a modulating signal in the vicinity of a carrier frequency fc is reduced as much as possible, and injection locking on the receiving side is facilitated. In the case of a digital system, DC-free coding is performed to prevent the occurrence of a DC component due to a continuation of a same code, for example.

In addition, to be used as a reference for injection locking on the receiving side, a reference carrier wave frequency corresponding to the carrier signal used for modulation is desirably sent out in addition to the transmission signal (modulated signal) modulated in the millimeter wave band. The reference carrier signal has a frequency and a phase (and more desirably an amplitude) that correspond to those of the carrier signal used for modulation which carrier signal is output from the transmitting side local oscillating section 8304 and which are constant (unchanged) at all times. The reference carrier signal is typically the carrier signal itself used for modulation. However, it suffices for the reference carrier signal to be at least in synchronism with the carrier signal, and the reference carrier signal is not limited to the above. For example, the reference carrier signal may be a signal of a different frequency (for example a harmonic signal) which signal is in synchronism with the carrier signal used for modulation, or may be a signal of the same frequency but of a different phase (for example a quadrature carrier signal orthogonal to the carrier signal used for modulation).

Depending on the modulating system and the modulating circuit, there are cases where the output signal itself of the modulating circuit includes the carrier signal (for example standard amplitude modulation, ASK and the like), and cases where the carrier wave is suppressed (carrier wave suppressing type amplitude modulation and ASK, PSK and the like). Thus, a circuit configuration for sending out the reference carrier signal together with the signal modulated in the millimeter wave band from the transmitting side is selected according to the type of the reference carrier signal (whether the carrier signal itself used for modulation is used as the reference carrier signal), the modulating system, and the modulating circuit.

[Modulation Functional Part: Second Example]

FIGS. 3A to 3C show examples of configuration of the second example of the modulation functional part 8300B and the peripheral circuit of the modulation functional part 8300B. A modulation object signal processing section 8301 is provided in a stage preceding the modulation functional part 8300B (frequency mixing section 8302). Each of the examples shown in FIGS. 3A to 3C is an example of configuration corresponding to a digital system. The modulation object signal processing section 8301 subjects data supplied from the parallel-serial converting section 8114 to DC-free coding such as 8-9 conversion coding (8B/9B coding), 8-10 conversion coding (8B/10B coding), scramble processing or the like to solve a problem that a DC component can occur due to a continuation of a same code. Though not shown, the modulation object signal is desirably subjected to high-pass filter processing (or band-pass filter processing) in an analog modulating system.

A first basic configuration shown in FIG. 3A has a reference carrier signal processing section 8306 and a signal synthesizing circuit 8308, and performs an operation of synthesizing (mixing) the output signal (transmission signal) of the modulating circuit (first frequency converting section) and the reference carrier signal. This system can be said to be a universal system not dependent on the type of the reference carrier signal, the modulating system, or the modulating circuit. However, depending on the phase of the reference carrier signal, the synthesized reference carrier signal may be detected as a direct-current offset component at the time of demodulation on the receiving side, and affect the reproducibility of the baseband signal. In this case, a measure is taken to suppress the direct-current component on the receiving side. In other words, the reference carrier signal is desirably in a phase relation that eliminates a need for removing the direct-current offset component at the time of demodulation.

The reference carrier signal processing section 8306 adjusts the phase and amplitude of a modulation carrier signal supplied from the transmitting side local oscillating section 8304 as demanded, and supplies the output signal as the reference carrier signal to the signal synthesizing circuit 8308. For example, the first configuration is essentially adopted in the case of a system where the output signal itself of the frequency mixing section 8302 does not include the carrier signal whose frequency and phase are constant at all times (system of modulating frequency or phase) and in a case where a harmonic signal or a quadrature carrier signal of the carrier signal used for modulation is used as the reference carrier signal.

In this case, a harmonic signal or a quadrature carrier signal of the carrier signal used for modulation can be used as the reference carrier signal, and the amplitudes and phases of the transmission signal and the reference carrier signal can be adjusted separately from each other. Specifically, the amplifying section 8117 makes gain adjustment with attention directed to the amplitude of the transmission signal, and at this time, the amplitude of the reference carrier signal is also adjusted simultaneously. However, the reference carrier signal processing section 8306 can adjust only the amplitude of the reference carrier signal to be a desirable amplitude in relation to injection locking.

The first configuration has the signal synthesizing circuit 8308 to synthesize the transmission signal and the reference carrier signal. However, this is not essential. As in a second basic configuration shown in FIG. 3B, the transmission signal and the reference carrier signal may be sent to the receiving side through separate millimeter wave signal transmission lines 9 by separate antennas 8136_1 and 8136_2 desirably without causing interference. The second basic configuration can send out the reference carrier signal whose amplitude is also constant at all times, and therefore this system can be said to be an optimum system from a viewpoint of the ease of achieving injection locking.

The first basic configuration and the second basic configuration have an advantage of being able to adjust the amplitudes and phases of the carrier signal used for modulation (or the transmission signal to be sent out) and the reference carrier signal separately from each other. Thus, the first basic configuration and the second basic configuration can be said to be suitable for preventing the occurrence of a direct-current offset in demodulation output by setting a modulation axis on which transmission object information is superimposed and an axis of the reference carrier signal used for injection locking (reference carrier axis) to different phases rather than the same phase.

When the output signal itself of the frequency mixing section 8302 can include the carrier signal whose frequency and phase are constant at all times, a third basic configuration shown in FIG. 3C without the reference carrier signal processing section 8306 or the signal synthesizing circuit 8308 can be adopted. It suffices to send out only the transmission signal modulated into the millimeter wave band by the frequency mixing section 8302 to the receiving side, and treat the carrier signal included in the transmission signal as the reference carrier signal. It is not necessary to further add another reference carrier signal to the output signal of the frequency mixing section 8302 and send the output signal to the receiving side. For example, the third basic configuration can be adopted in the case of an amplitude modulating system (for example an ASK system). In this case, preferably, DC-free processing is performed.

However, also in amplitude modulation and ASK, the frequency mixing section 8302 may be actively formed as a circuit of a carrier wave suppressing system (for example a balanced modulator circuit or a double-balanced modulator circuit), and the reference carrier signal may be sent together with the output signal (transmission signal) of the frequency mixing section 8302 as in the first basic configuration or the second basic configuration.

As shown in FIGS. 3A to 3C, any of the first to third basic configurations can employ a mechanism of receiving information based on a result of injection locking detection on the receiving side from the receiving side, and adjusting the frequency of the modulation carrier signal or the phase of the millimeter wave (especially a signal used for an injection signal on the receiving side: for example the reference carrier signal or the transmission signal) or the reference carrier signal. The transmission of the information from the receiving side to the transmitting side by the millimeter wave is not essential, but may be performed by an arbitrary system regardless of whether the system is a wired system or a wireless system.

Each of the first to third basic configurations adjusts the frequency of the modulation carrier signal (and the reference carrier signal) by controlling the transmitting side local oscillating section 8304.

The first basic configuration and the second basic configuration adjust the amplitude and phase of the reference carrier signal by controlling the reference carrier signal processing section 8306 and the amplifying section 8117. Incidentally, it is conceivable that the first basic configuration may adjust the amplitude of the reference carrier signal by the amplifying section 8117 for adjusting transmission power. In this case, however, there is a difficulty in that the amplitude of the transmission signal is also adjusted at the same time.

The third basic configuration suitable for a system of modulating amplitude (analog amplitude modulation or digital ASK) adjusts a carrier frequency component (corresponding to the amplitude of the reference carrier signal) in the transmission signal by adjusting the direct-current component of the modulation object signal or controlling a modulation factor (percentage modulation). For example, consideration will be given to a case of modulating a signal obtained by adding the direct-current component to the transmission object signal. In this case, when the modulation factor is made constant, the amplitude of the reference carrier signal is adjusted by controlling the direct-current component. When the direct-current component is made constant, the amplitude of the reference carrier signal is adjusted by controlling the modulation factor.

However, in this case, without a need to use the signal synthesizing circuit 8308, by merely sending out only the transmission signal output from the frequency mixing section 8302 to the receiving side, the transmission signal is automatically sent out as a signal in which the transmission signal obtained by modulating the carrier signal by the transmission object signal and the carrier signal used for the modulation are mixed with each other. Naturally, the reference carrier signal is superimposed on the same axis as the modulation axis (in phase with the modulation axis) on which the transmission object signal of the transmission signal is superimposed. On the receiving side, the carrier frequency component in the transmission signal is used as the reference carrier signal for injection locking. Incidentally, when considered in a phase plane, the modulation axis on which the transmission object information is superimposed and the axis of the carrier frequency component (reference carrier signal) used for injection locking are in phase with each other, so that a direct-current offset resulting from the carrier frequency component (reference carrier signal) occurs in demodulation output.

[Demodulation Functional Part: Second Example]

FIGS. 4A to 4C show examples of configuration of the second example of the demodulation functional part 8400B and the peripheral circuit of the demodulation functional part 8400B. The demodulation functional part 8400B in the second example includes a receiving side local oscillating section 8404. An injection signal is supplied to the receiving side local oscillating section 8404, whereby an output signal corresponding to the carrier signal used for modulation on the transmitting side is obtained. Typically, an oscillating output signal synchronized with the carrier signal used on the transmitting side is obtained. Then, a frequency mixing circuit 8402 multiplies (synchronously detects) a received millimeter wave transmission signal by a carrier signal for demodulation (reproduced carrier signal) based on the output signal of the receiving side local oscillating section 8404, whereby a synchronous detection signal is obtained. A high-frequency component of the synchronous detection signal is removed by a filter processing section 8410, whereby the waveform (baseband signal) of the input signal sent from the transmitting side is obtained. The following processing is the same as in the first example.

The frequency mixing circuit 8402 performs frequency conversion (down conversion and demodulation) by synchronous detection. Thereby advantages of providing an excellent bit error rate characteristic and allowing application of phase modulation and frequency modulation by developing the synchronous detection to quadrature detection, for example, can be obtained.

In supplying the reproduced carrier signal based on the output signal of the receiving side local oscillating section 8404 to the frequency mixing circuit 8402 and performing demodulation, it is necessary to consider a phase shift, and it is important to provide a phase adjusting circuit in a synchronous detection system. This is because the received transmission signal and the oscillating output signal output from the receiving side local oscillating section 8404 by injection locking have a phase difference from each other, for example.

In this example, a phase and amplitude adjusting section 8406 having not only a function of the phase adjusting circuit but also a function of adjusting injection amplitude is provided to the demodulation functional part 8400B. The phase adjusting circuit may be provided for either the injection signal to the receiving side local oscillating section 8404 or the output signal of the receiving side local oscillating section 8404, or may be applied to both the signals. The receiving side local oscillating section 8404 and the phase and amplitude adjusting section 8406 form a carrier wave reproducing section 8403 functioning as a demodulation side (second) carrier signal generating section for generating a demodulation carrier signal synchronized with the modulation carrier signal and supplying the demodulation carrier signal to the frequency mixing circuit 8402.

As indicated by a broken line in FIG. 4A, a direct-current component suppressing section 8407 for removing a direct-current offset component that can be included in the synchronous detection signal according to the phase of the reference carrier signal synchronized into the transmission signal (specifically when the modulating signal and the reference carrier signal are in phase with each other) is provided in a stage subsequent to the frequency mixing circuit 8402.

In supplying the injection signal to the receiving side local oscillating section 8404, it is conceivable that the received millimeter wave signal may be supplied as the injection signal to the receiving side local oscillating section 8404, as in the first basic configuration shown in FIG. 4A. The first basic configuration suffices when a modulating signal component is prevented from being present in the vicinity of the carrier frequency by performing modulation after suppressing the low-frequency component of the modulation object signal (performing DC-free coding or the like) in advance on the transmitting side.

As in a second basic configuration shown in FIG. 4B, a frequency separating section 8401 may be provided to frequency-separate a transmission signal and a reference carrier signal from a received millimeter wave signal, set the separated reference carrier signal component as an injection signal, and supply the injection signal to a receiving side local oscillating section 8404. A frequency component unnecessary for injection locking is suppressed in advance, and then the injection signal is supplied. Thus the injection locking can be achieved easily.

A third basic configuration shown in FIG. 4C corresponds to the second basic configuration shown in FIG. 3B on the transmitting side. The third basic configuration shown in FIG. 4C represents a system in which a transmission signal and a reference carrier signal are received through separate millimeter wave signal transmission lines 9 by separate antennas 8236_1 and 8236_2 desirably without causing interference. The third basic configuration on the receiving side can supply the receiving side local oscillating section 8404 with the reference carrier signal whose amplitude is also constant at all times, and therefore this system can be said to be an optimum system from a viewpoint of the ease of achieving injection locking.

A millimeter wave signal received by an antenna 8236_1 is supplied to the frequency mixing circuit 8402 and the receiving side local oscillating section 8404 by a distributor (branching filter) not shown in the figure. Injection locking functions in the receiving side local oscillating section 8404 to output a reproduced carrier signal synchronized with the carrier signal used for modulation on the transmitting side.

Whether injection locking can be achieved on the receiving side (whether the reproduced carrier signal synchronized with the carrier signal used for modulation on the transmitting side can be obtained) depends also on an injection level (amplitude level of the reference carrier signal input to the oscillating circuit of the injection locking system), a modulating system, a data rate, carrier frequency and the like. In addition, it is important to reduce a component of the transmission signal which component is within a band where injection locking can be achieved. For this, it is desirable to perform DC-free coding on the transmitting side so that the center (average) frequency of the transmission signal becomes substantially equal to the carrier frequency and so that the center (average) phase of the transmission signal becomes substantially equal to zero (origin on a phase plane).

Each of the first to third basic configurations controls a lock range by controlling an injection voltage $V_i$ and a self-running oscillating frequency $f_o$. In other words, it is important to adjust the injection voltage $V_i$ and the self-running oscillating frequency $f_o$ so as to achieve injection locking. For example, an injection locking control section 8440 is provided in a stage subsequent to the frequency mixing circuit 8402 (in a stage subsequent to the direct-current component suppressing section 8407 in the examples of FIGS. 4A to 4C). The injection locking control section 8440 has a function of an injection locking detecting section for detecting information indicating an injection locking state of the carrier wave reproducing section 8403 (receiving side local oscillating section 8404).

The injection locking control section 8440 determines a state of injection locking on the basis of the synchronous detection signal (baseband signal) obtained by the frequency mixing circuit 8402. On the basis of a result of the determination, the injection locking control section 8440 controls each part to be adjusted so as to achieve injection locking.

At this time, one or both of a method of dealing on the receiving side and a method of supplying information contributing to control (not only control information but also a sensing signal that can be a basis for the control information, or the like), as indicated by a broken line in FIGS. 4A to 4C, and dealing on the transmitting side can be adopted. In either case, an injection locking adjusting section is provided to make synchronization adjustment so as to synchronize the carrier signal for demodulation which carrier signal is generated in the receiving side local oscillating section 8404 with the carrier signal for modulation which carrier signal is generated in the transmitting side local oscillating section 8304. For example, the reference carrier signal processing section 8306 or the injection locking control section 8440 performs a function of the injection locking adjusting section.

The method of dealing on the receiving side has difficulties in terms of power consumption and interference resistance because injection locking cannot be achieved on the receiving side unless a millimeter wave signal (reference carrier signal component in particular) of a certain strength is transmitted. However, the method of dealing on the receiving side has an advantage of being able to deal on the receiving side alone.

On the other hand, the method of dealing on the transmitting side, though needing transmission of information from the receiving side to the transmitting side, has advantages of being able to transmit a millimeter wave signal with a minimum power to achieve injection locking on the receiving side, being able to reduce power consumption, and improving interference resistance, for example.

The following advantages are obtained by applying the injection locking system in intra-casing signal transmission and inter-device signal transmission. The transmitting side local oscillating section 8304 on the transmitting side can relax demanded specifications for stability of frequency of the carrier signal used for modulation. The receiving side local oscillating section 8404 on the side of performing injection locking needs to have a low Q-value so as to follow frequency variation on the transmitting side. Though detailed description will be omitted, in the injection locking system, the Q-value affects the lock range, and the lock range is widened as the Q-value becomes lower.

This is convenient when the whole of the receiving side local oscillating section 8404 including a tank circuit (an inductance component and a capacitance component) is formed on CMOS. The receiving side local oscillating section 8404 on the receiving side may have a low Q-value. This is also true for the transmitting side local oscillating section 8304 on the transmitting side. The transmitting side local oscillating section 8304 may have low frequency stability, and may have a low Q-value.

The miniaturization of CMOS will progress further in the future, and the operating frequency of CMOS will rise further. Use of high carrier frequency is desired to realize a wider-band small transmission system. The injection locking system in the present example can relax demanded specifications for stability of oscillating frequency, and therefore allows a carrier signal of high frequency to be used easily.

A fact that the frequency is high but frequency stability may be low (or that the Q-value may be low) means that use of a highly stable frequency multiplying circuit, a PLL circuit for carrier synchronization, or the like for a purpose of realizing a highly stable carrier signal at a high frequency is not necessary, and that a communicating function can be achieved compactly on a small circuit scale even with a higher carrier frequency.

The reproduced carrier signal synchronized with the carrier signal used on the transmitting side is obtained by the receiving side local oscillating section 8404, and supplied to the frequency mixing circuit 8402 to perform synchronous detection. Therefore a band-pass filter for wavelength selection does not need to be provided in a stage preceding the frequency mixing circuit 8402. For an operation of selecting reception frequency, it practically suffices to perform control of perfectly synchronizing the local oscillating circuits for transmission and reception with each other (allowing injection locking to be achieved), so that the reception frequency is selected easily. In the case of the millimeter wave band, only a short time is demanded for injection locking as compared with lower frequencies, and the operation of selecting the reception frequency can be completed in a short time.

Because the local oscillating circuits for transmission and reception are perfectly synchronized with each other, a variation component of the carrier frequency on the transmitting side is cancelled out. A frequency shift system according to the present embodiment which system will be described later is susceptible to phase shifts. However, this difficulty is solved by applying the injection locking system.

When injection locking is applied in combination with synchronous detection, effects of the problem of interference are reduced even in a case where a plurality of transmitting and receiving pairs make independent transmissions simultaneously as in a case of realizing multiple channels or full-duplex bidirectionality, for example, without a band-pass filter for wavelength selection being used on the receiving side.

<Basic Principles of Provision for Increasing Speed of Transmission Data>

Figure 5A:
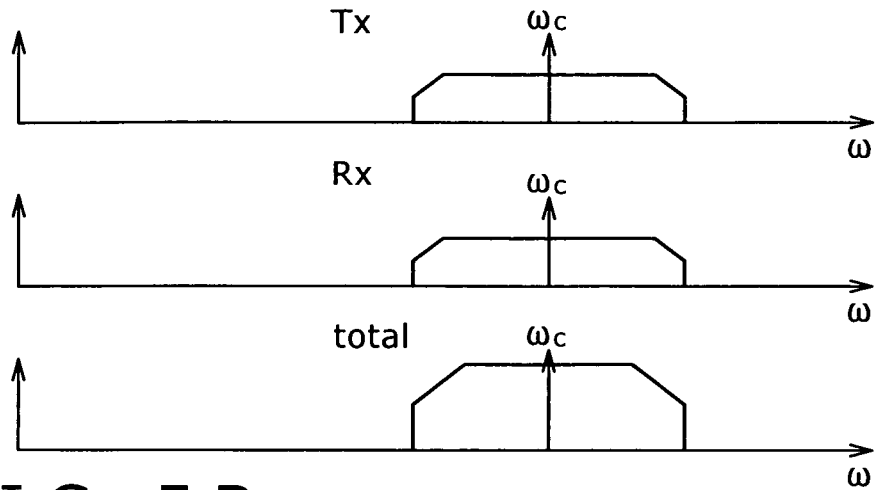
FIGS. 5A, 5B, and 5C are diagrams of assistance in explaining basic principles of provision for increasing the speed of transmission data according to the present embodiment.
Figure 5B:
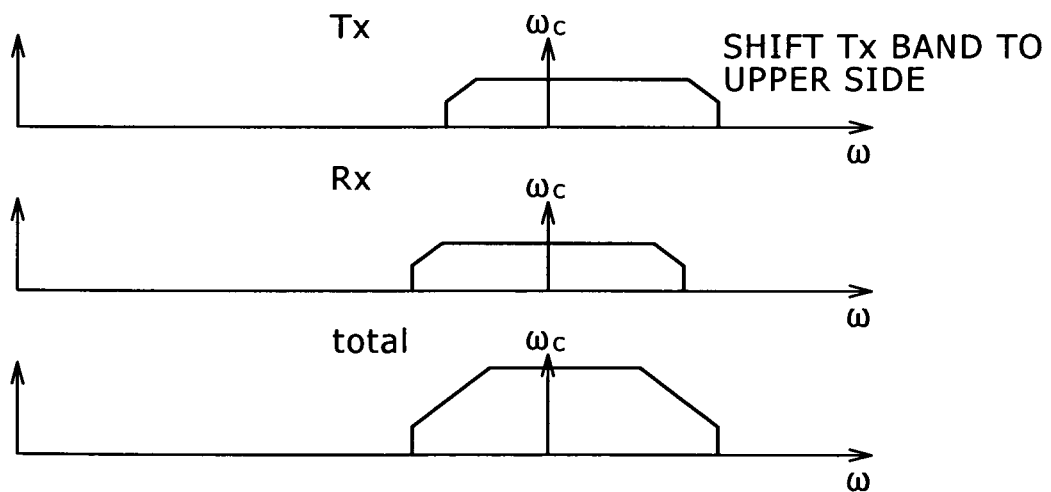
Figure 5C:
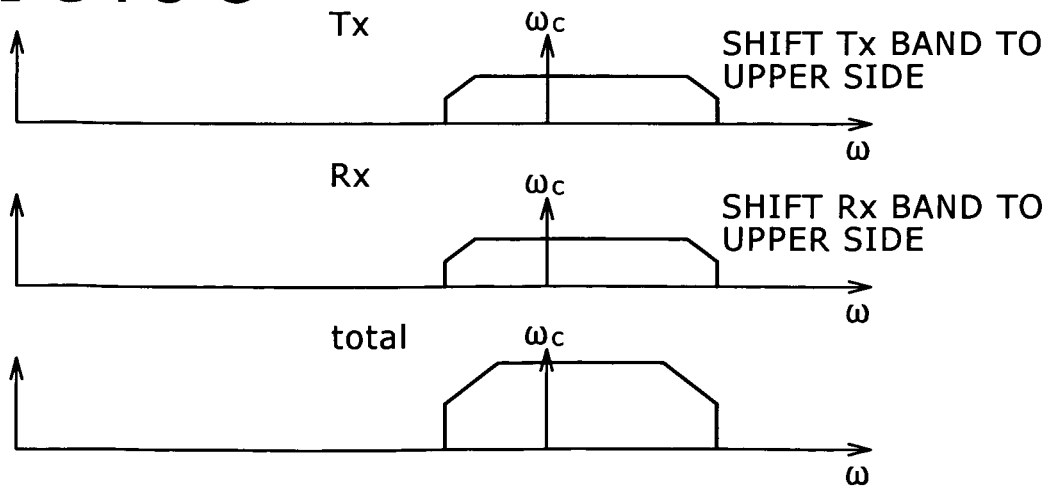

FIGS. 5A, 5B, and 5C are diagrams of assistance in explaining basic principles of provision for increasing the speed of transmission data according to the present embodiment. FIG. 5A is a diagram of assistance in explaining a comparative example to which a mechanism according to the present embodiment is not applied. FIG. 5B is a diagram of assistance in explaining a first basic example of the mechanism according to the present embodiment. FIG. 5C is a diagram of assistance in explaining a second basic example of the mechanism according to the present embodiment.

As shown in FIG. 5A, the comparative example is an example in which the carrier wave frequency is set at the center of a reception band (band of a demodulation frequency characteristic) and a transmission band (band of a modulation frequency characteristic) as in an ordinary case of modulating amplitude (see JP-T-2005-513866, for example). In this case, a wide frequency band is necessary to perform high-speed communication. However, there is a limit to widening each frequency band of a transmitting system, a transmission line (corresponding to the millimeter wave signal transmission line 9), and a receiving system. Even when provision for increasing the speed of transmission data is to be made by setting the usable band of the carrier frequency to a band of shorter wavelengths, or for example using a submillimeter wave band in place of the millimeter wave band, the provision cannot be made limitlessly, and there occurs a limit in terms of system configuration.

On the other hand, the mechanism according to the present embodiment achieves high-speed transmission by shifting the carrier wave frequency with respect to the center of the band of a transmission characteristic between transmission and reception (total communication characteristic) having the same bandwidth as in the comparative example. In other words, provision for wide-band transmission is made by using the asymmetry of the transmission frequency characteristic between transmission and reception with respect to the carrier frequency. As compared with a combination of a transmitting section and a receiving section having the same bandwidth as in the comparative example, a wider signal band can be obtained, and higher-speed transmission can be made. The mechanism according to the present embodiment can be said to be a very effective method as a method for achieving a high data rate in a limited band. In the following, such a mechanism according to the present embodiment will also be referred to simply as a "frequency shift system."

In the mechanism as a provision for higher speed according to the present embodiment, a receiving side employs a synchronous detection system. It suffices for the receiving side to be based on the synchronous detection system, and the receiving side may use injection locking.

Methods of shifting the carrier wave frequency with respect to the center of the band of the transmission frequency characteristic between transmission and reception include a first method of shifting only one of a Tx (transmission) band and an Rx (reception) band with respect to the carrier wave frequency and a second method of shifting both of the Tx band and the Rx band in a same direction with respect to the carrier wave frequency. In either case, wide-band transmission is made possible by shifting the frequency characteristics of a Tx system and an Rx system with respect to a carrier wave (carrier).

For example, a first basic example of the present embodiment which example is shown in FIG. 5B is an application of the first method in which the center of the Rx band is made to coincide with the carrier wave frequency $\omega c$, and only the Tx band is shifted to an upper side with respect to the carrier wave frequency $\omega c$. Though not shown in the figure, the center of the Rx band may be made to coincide with the carrier wave frequency $\omega c$, and only the Tx band may be shifted to a lower side with respect to the carrier wave frequency •c. In addition, though not shown in the figure, the center of the Tx band may be made to coincide with the carrier wave frequency $\omega c$, and only the Rx band may be shifted to the upper side or the lower side with respect to the carrier wave frequency $\omega c$.

In setting an actual frequency arrangement, the first basic example of the present embodiment is realized by shifting a setting of the carrier frequency used by the transmitting side local oscillating section 8304 with respect to the center of a transmission band (band of a modulation frequency characteristic) determined by a measurement or the like.

A second basic example of the present embodiment which example is shown in FIG. 5C is an application of the second method in which both of the Tx band and the Rx band are shifted to the upper side with respect to the carrier wave frequency ωc. Though not shown in the figure, both of the Tx band and the Rx band may be shifted to the lower side with respect to the carrier wave frequency ωc. Incidentally, the Tx band and the Rx band need to be shifted in a same direction with respect to the carrier wave frequency ωc. There is no (or little) effect when the Tx band and the Rx band are shifted in opposite directions from each other.

In setting an actual frequency arrangement, the second basic example of the present embodiment is realized by shifting a setting of the frequency of the reproduced carrier wave used by the receiving side local oscillating section 8404 (that is, the carrier frequency used by the transmitting side local oscillating section 8304) with respect to the center of a reception band (band of a demodulation frequency characteristic) determined by a measurement or the like.

Wide-band transmission made possible by shifting the Tx band and the Rx band with respect to the center of the carrier wave frequency by applying the first method or the second method according to the present embodiment is considered to result from the following. As will be described later, when the frequency shift according to the present embodiment is applied, an imaginary axis component is demodulated into a large component due to asymmetry. However, effects of the imaginary axis component can be suppressed when baseband conversion is performed by synchronous detection.

Making description in relation to a frequency axis, the substantial transmission band of each of the transmitting system Tx and the receiving system Rx is not widened due to so-called aliasing, but a total frequency band obtained by synthesizing both the transmission bands of the transmitting system Tx and the receiving system Rx appears to be expanded. Making description in relation to impulse response, the impulse response (Impulse Responses at Different Phases) of the imaginary axis component has a narrower pulse width, and thus allows higher-speed transmission. By shifting the frequency characteristics of the transmitting system Tx and the receiving system Rx with respect to the carrier wave, wide-band transmission can be made without the substantial transmission band of each of the transmitting system Tx and the receiving system Rx being widened.

However, there is a large imaginary axis component with respect to the carrier frequency (local oscillating frequency) for synchronous detection. That is, when an asymmetric frequency characteristic is used as in the first basic example shown in FIG. 5B or the second basic example shown in FIG. 5C, impulse width is narrowed, and high-speed data can be transmitted, but sensitivity to phase shifts of the reproduced carrier wave output from the local oscillator for synchronous detection (carrier wave reproducing section 8403) is increased.

<Simulation Analysis>

Figure 6A:
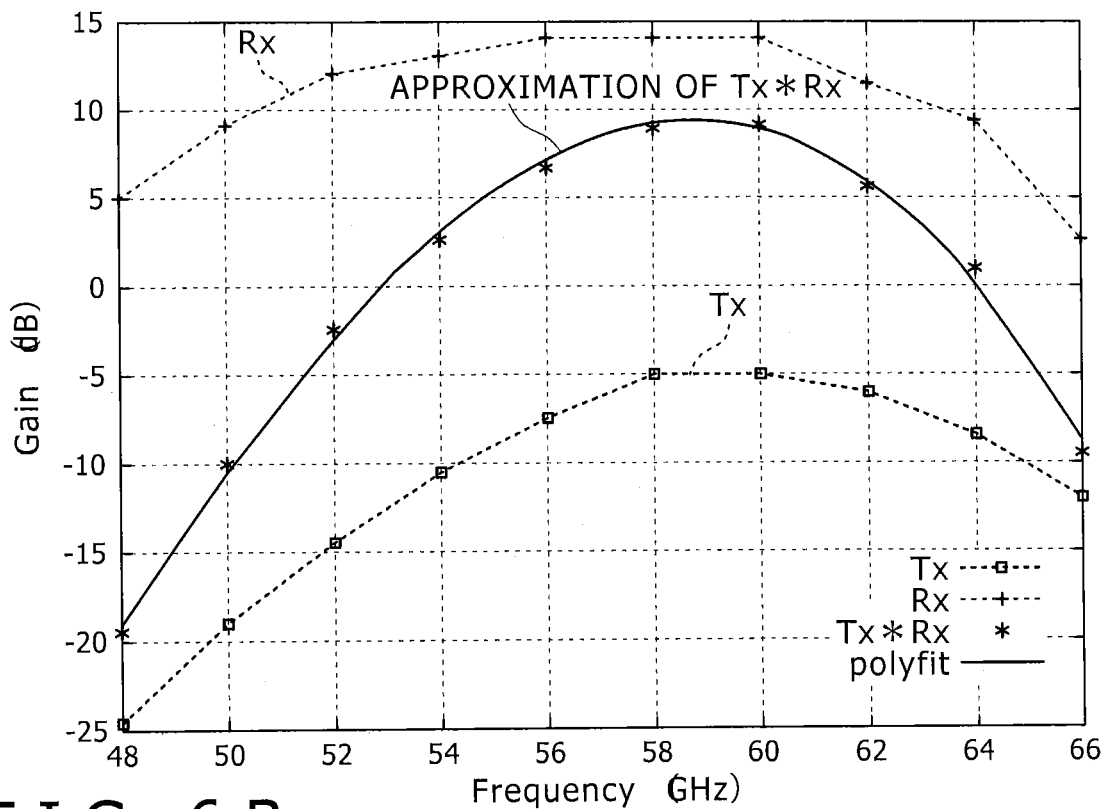
FIGS. 6A and 6B are diagrams showing an example of a total frequency characteristic of a transmitting chip and a receiving chip.

FIGS. 6A to 11B are diagrams of assistance in explaining a comparative example to which the present embodiment is not applied and examples in which the present embodiment is analyzed by simulation. FIGS. 6A and 6B are diagrams showing an example of frequency characteristics of a transmitting chip and a receiving chip. FIGS. 7A and 7B are diagrams showing an example of simulation characteristics of the comparative example. FIGS. 8 to 11B are diagrams showing an example of simulation characteristics of the present embodiment.

In simulation, frequency characteristics of the transmitting chip (semiconductor chip 103 on the transmitting side) and the receiving chip (semiconductor chip 203 on the receiving side) are first obtained from amplitude characteristic measurement data.

For example, a modulation frequency characteristic is measured as the frequency characteristic of the transmitting chip. Specifically, in order to ignore effects of the millimeter wave signal transmission line 9, that is, in order to grasp the characteristic of the transmitting chip as a single unit, the output terminal of the amplifying section 8117 is set as a measurement point, a modulating signal is modulated by a carrier wave of a unique carrier frequency, and a frequency characteristic as a ratio of an output signal to the carrier wave (Conversion Gain=Output Signal/Carrier Wave [dB]) is measured. Incidentally, it suffices to supply the modulating signal (transmission object signal) from the LSI functional part 104.

The frequency characteristic of a conversion gain is measured as the frequency characteristic of the receiving chip. Specifically, in order to ignore effects of the millimeter wave signal transmission line 9, that is, in order to grasp the characteristic of the receiving chip as a single unit, the input terminal of the amplifying section 8224 is set as an input point of a millimeter wave signal (unmodulated wave=RF input), the millimeter wave signal is modulated by a reproduced carrier wave of a unique carrier frequency, and a frequency characteristic as a ratio of a demodulation output to the RF input (Conversion Gain=Demodulation Output/RF Input [dB]) is measured. Incidentally, in order to facilitate elimination of effects of a direct-current component and a harmonic component included in the demodulation output, a measurement point may be the output terminal of the filter processing section 8410 or the like.

Then, a total frequency characteristic is obtained (approximated) by approximating and extrapolating data points obtained by a synthesis of the obtained respective frequency characteristics of both chips (Tx value*Rx value) by a quadratic function or a cubic function. Assuming that the frequency characteristic of the millimeter wave signal transmission line 9 is flat and lossless within a range of the transmission band, the obtained total frequency characteristic can be considered to be a total frequency characteristic from the signal input terminal (LSI functional part 104) of the transmitting system to the signal output terminal (LSI functional part 204) of the receiving system.

Thereafter, the approximated total frequency characteristic is shifted to a baseband side by an amount corresponding to the carrier frequency. In this state, impulse response of an I-axis component (in-phase component) and a Q-axis component (quadrature component) is simulated. Data transmission performance is considered from a result of the simulation. In addition, conditions for higher speed of transmission data are considered from relation between the asymmetry of the frequency characteristic and the impulse response.

[Total Frequency Characteristic]

FIG. 6A shows an example of the total frequency characteristic of amplitude characteristics of the transmitting chip and the receiving chip. Incidentally, measurement was made with the carrier frequency (local oscillating frequency) set at 55.5 GHz. When the carrier frequency is set at other than 55.5 GHz, it suffices to consider with the characteristics shifted relatively.

Squares shown in FIG. 6A represent measurement data of the ratio of the output signal to the carrier wave of the transmitting chip. A line (Tx) connecting these squares represents the modulation frequency characteristic of the transmitting chip. Plus signs shown in FIG. 6A represent measurement data of the ratio of the demodulation output to the RF input of the receiving chip. A line (Rx) connecting these plus signs represents the demodulation frequency characteristic of the receiving chip. Asterisks shown in FIG. 6A represent data obtained by a synthesis of the measurement data of the transmitting chip and the measurement data of the receiving chip (Tx*Rx). A line (polyfit) along the data represents the approximated and extrapolated total frequency characteristic.

As is understood from FIG. 6A, the total frequency characteristic is substantially symmetric when the carrier frequency is set at 58.5 GHz, while the total frequency characteristic exhibits asymmetry when the carrier frequency is lower than 58.5 GHz, or for example 55.5 GHz or 53.5 GHz.

Figure 6B:
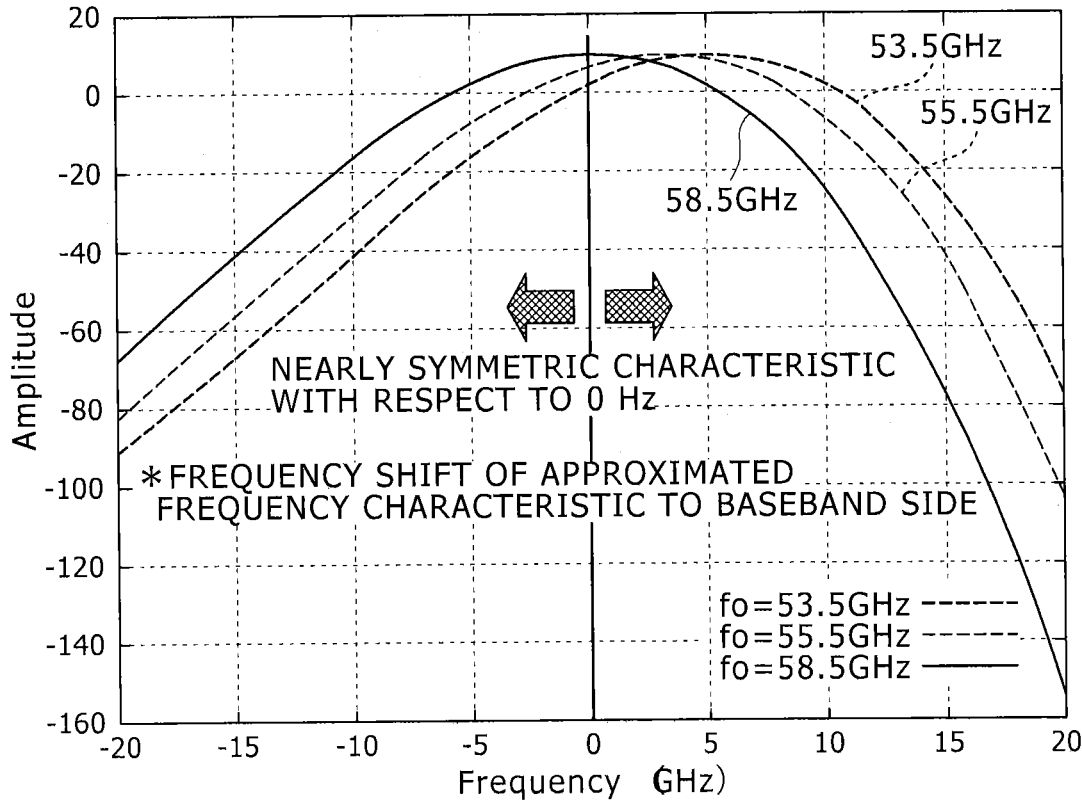

FIG. 6B is a diagram showing states in which the carrier frequency is set at 58.5 GHz, 55.5 GHz, and 53.5 GHz, and the total frequency characteristic shown in FIG. 6A is shifted to the baseband side by amounts corresponding to the carrier frequency. Incidentally, suppose that a phase characteristic is even (flat).

A solid line in FIG. 6B corresponds to the comparative example in which the carrier frequency is set at 58.5 GHz. In the comparative example, the total frequency characteristic is substantially symmetric. The comparative example also has a characteristic that is substantially bilaterally symmetric also in a baseband region with respect to a relative frequency=0 GHz.

Two broken lines in FIG. 6B correspond to cases of the present embodiment in which cases the carrier frequency is set at 55.5 GHz and 53.5 GHz. In the cases of the present embodiment (55.5 GHz and 53.5 GHz), which cases will be described separately, asymmetry is exhibited when the relative frequency=0 GHz is set at the center.

In the existing case (comparative example) to which the present embodiment is not applied, the carrier frequency is set at the center of the band (58.5 GHz in this example) so that the total frequency characteristic is substantially symmetric.

Comparative Example

Figure 7A:
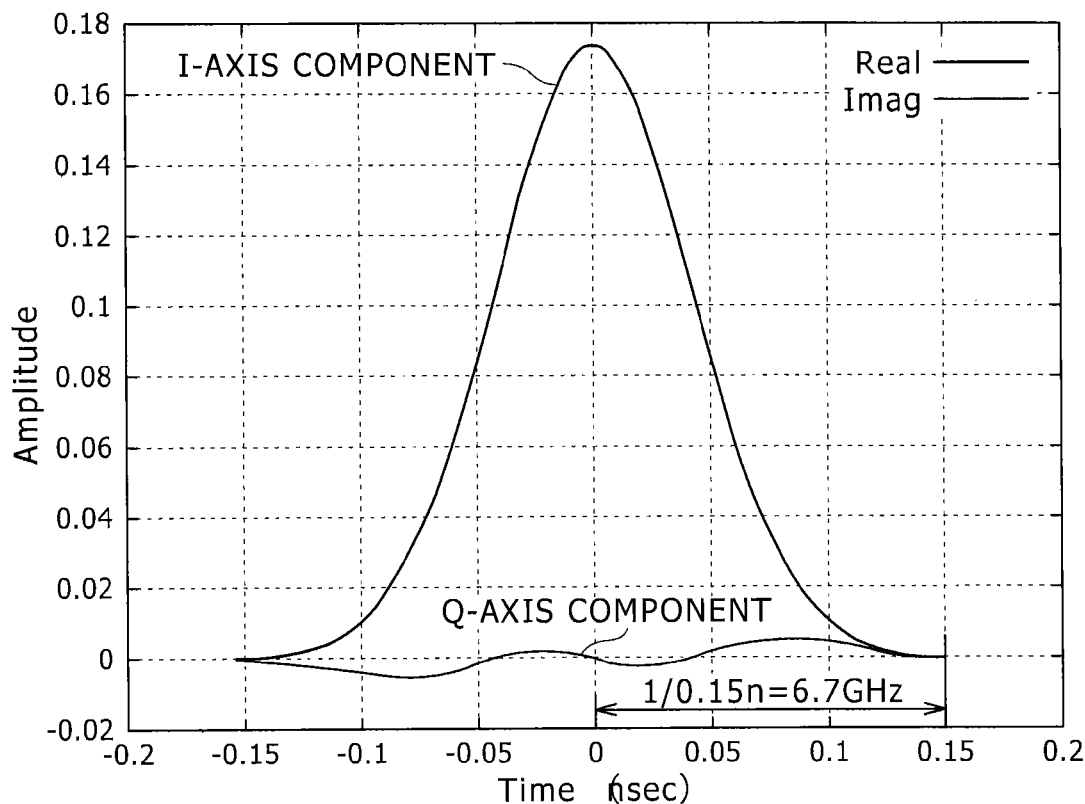
FIGS. 7A and 7B are diagrams showing an example of simulation characteristics of a comparative example.
Figure 7B:
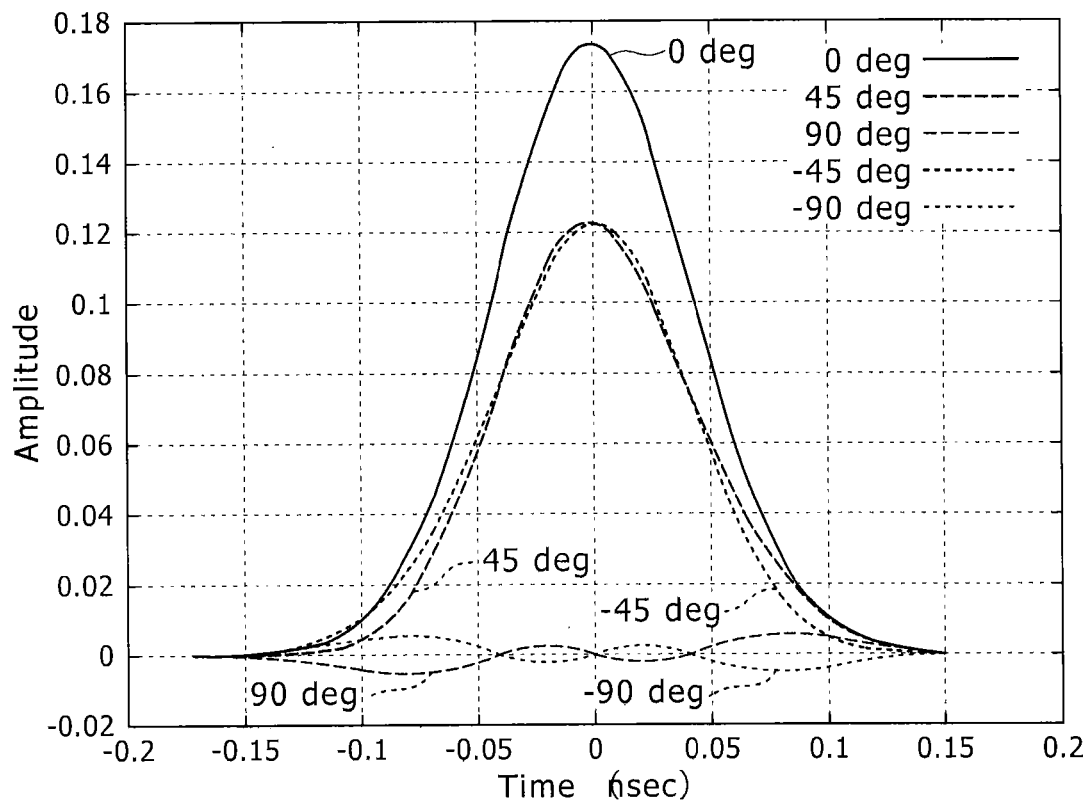

FIG. 7A shows a result of simulation of impulse response in the comparative example. FIG. 7A shows an I-axis component (Real Part) and a Q-axis component (Imaginary Part). FIG. 7B shows impulse response in the comparative example, that is, an example of a simulation characteristic of the I-axis component when the phase of the reproduced carrier wave (reference carrier signal component) input from the carrier wave reproducing section 8403 to the frequency mixing circuit 8402 is changed. FIG. 7B shows an example of characteristics in cases where relative phases (Different Phases) with respect to the I-axis component are 0 degrees, 45 degrees, 90 degrees, −45 degrees, and −90 degrees, respectively. The case of 0 degrees corresponds to the I-axis component in FIG. 7A. The case of 90 degrees corresponds to the Q-axis component in FIG. 7A.

As is understood from FIG. 7A and FIG. 7B, the impulse response in the comparative example has a small Q-axis component, and is resistant to phase shifts. A relative time taken for the I-axis component to become zero is 0.15. The pulse width is wider than in the present embodiment to be described later. Incidentally, a necessary bandwidth is 1/0.15 nsec=6.7 GHz.

Present Embodiment

First Example

Figure 8:
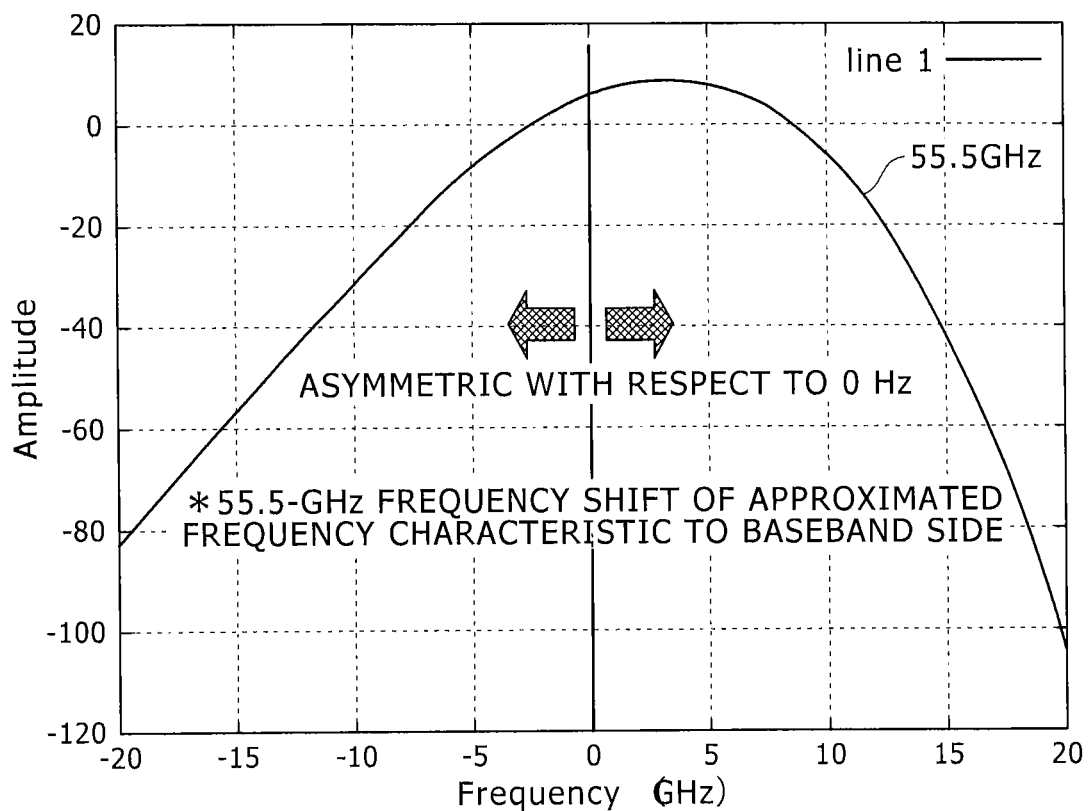
FIG. 8 is a diagram (1 of the first example) showing an example of simulation characteristics.

FIG. 8 is a diagram of assistance in explaining a state in which the total frequency characteristic shown in FIG. 6A is shifted to the baseband side by an amount corresponding to the carrier frequency when the carrier frequency is shifted from 58.5 GHz at which symmetry is exhibited to 55.5 GHz (present embodiment (first example)). This state is essentially the same as the state at 55.5 GHz in FIG. 6B. As has been described with reference to FIG. 6B, when the carrier frequency is shifted to 55.5 GHz, asymmetry is exhibited with respect to the relative frequency=0 GHz.

Figure 9A:
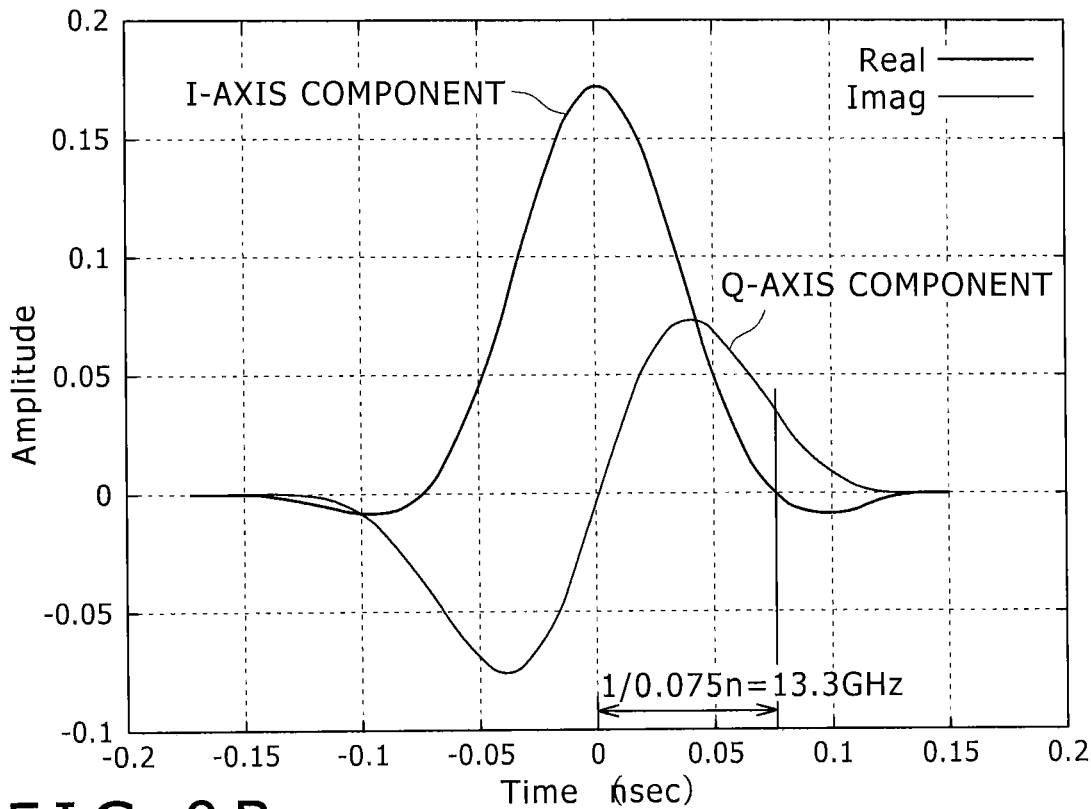
FIGS. 9A and 9B are diagrams (2 of the first example) showing an example of simulation characteristics.
Figure 9B:
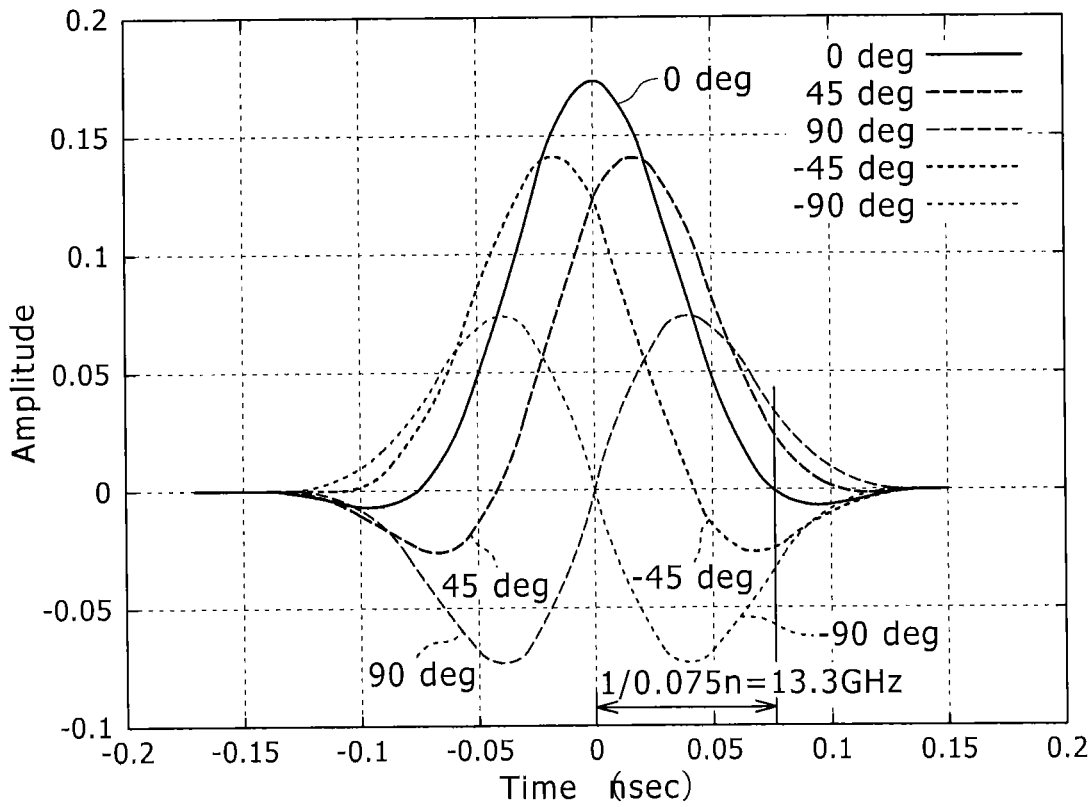

FIG. 9A shows a result of simulation of impulse response in the present embodiment (first example) in which the carrier frequency is shifted to 55.5 GHz. FIG. 9A shows an I-axis component and a Q-axis component. FIG. 9B shows impulse response in the present embodiment (first example), that is, an example of a simulation characteristic of the I-axis component when the phase of the reproduced carrier wave (reference carrier signal component) input from the carrier wave reproducing section 8403 to the frequency mixing circuit 8402 is changed. FIG. 9B shows an example of characteristics in cases where relative phases with respect to the I-axis component are 0 degrees, 45 degrees, 90 degrees, −45 degrees, and −90 degrees, respectively. The case of 0 degrees corresponds to the I-axis component in FIG. 9A. The case of 90 degrees corresponds to the Q-axis component in FIG. 9A.

As is understood from FIG. 9A and FIG. 9B, the impulse response in the present embodiment (first example) has a larger Q-axis component and is less resistant to phase shifts than in the case where the carrier frequency is 58.5 GHz (case of no frequency shift). On the other hand, a relative time taken for the I-axis component to become zero is 0.075. The pulse width is narrower than in the case of no frequency shift. The Q-axis component larger than in the comparative example can be said to be a part created by asymmetry.

Incidentally, even though the carrier frequency is only shifted from 58.5 GHz to 55.5 GHz, and the substantial bandwidth of each of the transmitting system and the receiving system is not changed, an apparent bandwidth as a total transmission characteristic is widened to 1/0.075 nsec=13.3 GHz (twice the bandwidth of the comparative example), so that high-speed communication can be performed at nearly double speed. In other words, by shifting the carrier frequency from the frequency at which symmetry is exhibited, provision for increasing the speed of transmission data can be made without changing the substantial bandwidth.

Present Embodiment

Second Example

Figure 10:
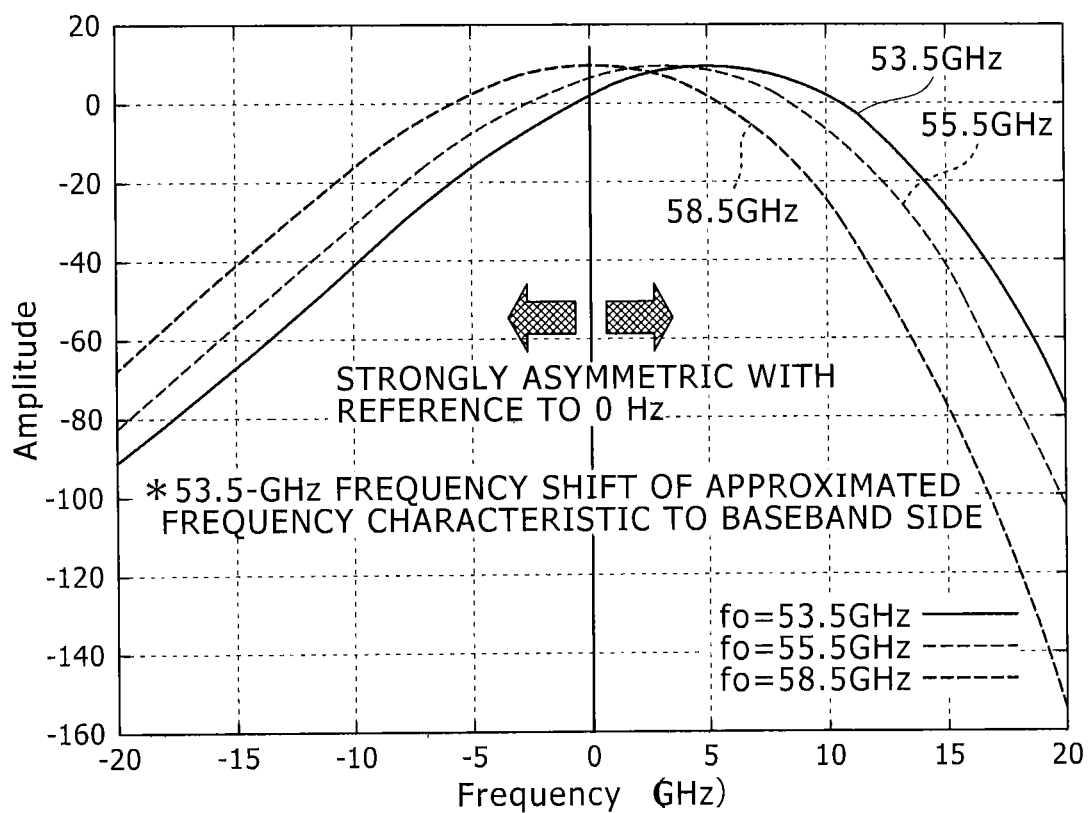
FIG. 10 is a diagram (1 of the second example) showing an example of simulation characteristics.

FIG. 10 is a diagram of assistance in explaining a state in which the total frequency characteristic shown in FIG. 6A is shifted to the baseband side by an amount corresponding to the carrier frequency when the carrier frequency is shifted from 58.5 GHz at which symmetry is exhibited to 53.5 GHz (present embodiment (second example)). A solid line corresponds to the present embodiment (second example). This state is essentially the same as the state at 53.5 GHz in FIG. 6B. For reference, the states of the comparative example and the present embodiment (first example) are indicated by broken lines. As has been described with reference to FIG. 6B, when the carrier frequency is shifted to 53.5 GHz, asymmetry is exhibited with respect to the relative frequency=0 GHz, and the degree of the asymmetry is higher than in the present embodiment (first example) in which the carrier frequency is shifted to 55.5 GHz.

Figure 11A:
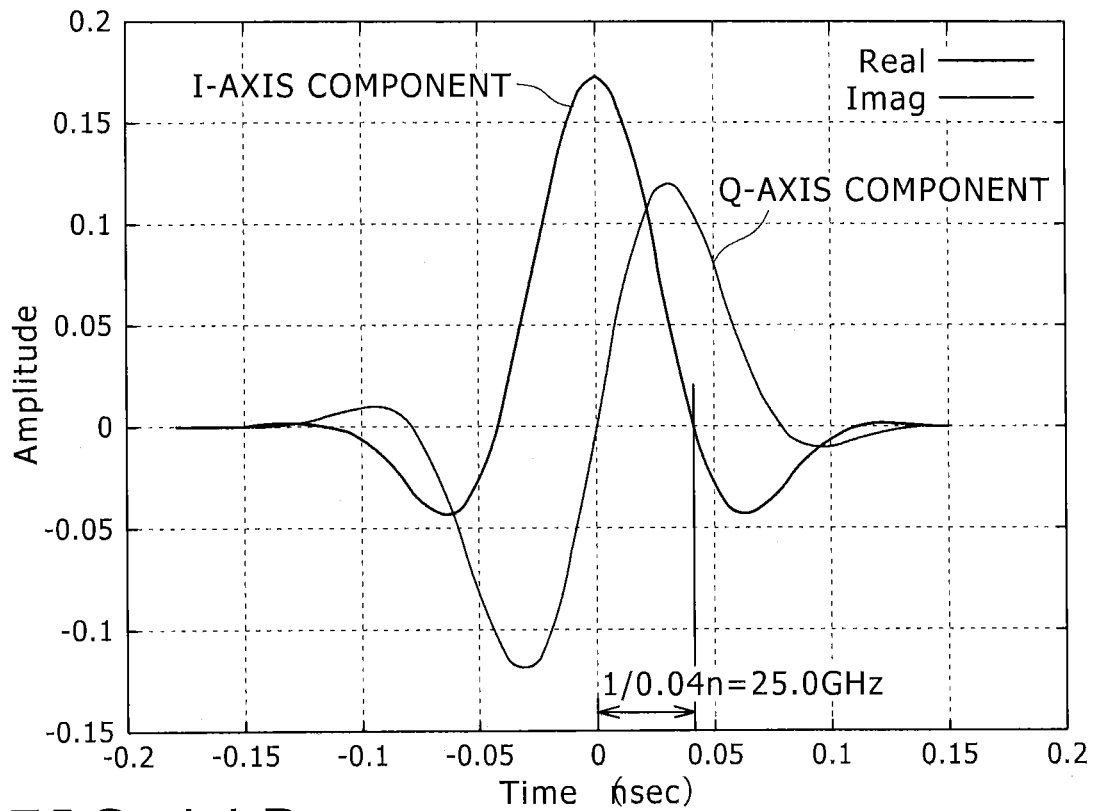
FIGS. 11A and 11B are diagrams (2 of the second example) showing an example of simulation characteristics.
Figure 11B:
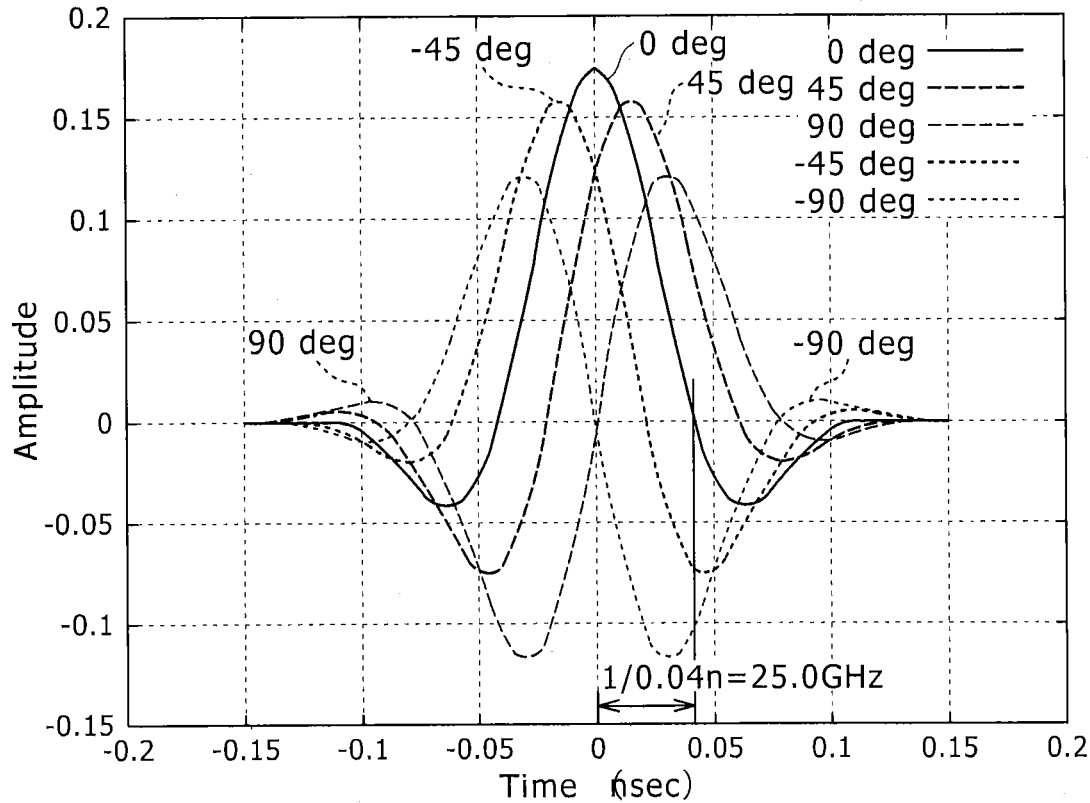

FIG. 11A shows a result of simulation of impulse response in the present embodiment (second example) in which the carrier frequency is shifted to 53.5 GHz. FIG. 11A shows an I-axis component and a Q-axis component. FIG. 11B shows impulse response in the present embodiment (second example), that is, an example of a simulation characteristic of the I-axis component when the phase of the reproduced carrier wave (reference carrier signal component) input from the carrier wave reproducing section 8403 to the frequency mixing circuit 8402 is changed. FIG. 11B shows an example of characteristics in cases where relative phases with respect to the I-axis component are 0 degrees, 45 degrees, 90 degrees, −45 degrees, and −90 degrees, respectively. The case of 0 degrees corresponds to the I-axis component in FIG. 11A. The case of 90 degrees corresponds to the Q-axis component in FIG. 11A.

As is understood from FIG. 11A and FIG. 11B, the impulse response in the present embodiment (second example) has a larger Q-axis component and is less resistant to phase shifts than in the case where the carrier frequency is 58.5 GHz (case of no frequency shift). On the other hand, a relative time taken for the I-axis component to become zero is 0.04. The pulse width is narrower than in the case of no frequency shift. The Q-axis component larger than in the comparative example can be said to be a part created by asymmetry.

Incidentally, even though the carrier frequency is only shifted from 58.5 GHz to 53.5 GHz, and the substantial bandwidth of each of the transmitting system and the receiving system is not changed, an apparent bandwidth as a total transmission characteristic is widened to 1/0.04 nsec=25.0 GHz (four times the bandwidth of the comparative example), so that high-speed communication can be performed at nearly four-fold speed. As compared with the present embodiment (first example) in which the carrier frequency is shifted to 55.5 GHz, the degree of magnitude of the Q-axis component is higher, and thus susceptibility to phase shifts is increased. However, data can be transmitted at higher speed because the pulse width is narrower.

As described above, a result of simulation analysis of the frequency characteristics of the transmitting chip and the receiving chip and impulse responses by approximation and extrapolation shows that impulse width is narrowed and high-speed data can be transmitted when an asymmetric frequency characteristic is used. While a wide band is necessary for high-speed communication, it can be difficult to obtain a wide band. The frequency shift mechanism according to the present embodiment does not widen substantial bandwidth even in such a case, and is thus highly effective. However, sensitivity to phase shifts of the reproduced carrier wave (so-called local oscillating wave) supplied to the frequency mixing circuit 8402 is increased.

Incidentally, though the transmission characteristics of the millimeter wave signal transmission line 9 are not taken into consideration in the above-described simulation analysis, the characteristics are also affected in practice.

[Comparison with Reference Example]

In a field of radio communication, achieving both high-speed signal transmission and an occupied frequency band (reduction of the occupied frequency band) is considered to be a condition necessary for efficient system construction.

For example, a spectrum of a transmission object signal is stored in both side bands of a frequency spectrum of amplitude modulation with a carrier wave frequency as a center of the frequency spectrum. A system of transmitting both side bands as they are while suppressing a carrier wave component is DSB (Double Side Band Suppressed Carrier) transmission. A system of transmitting only one of the upper side band and the lower side band is SSB (Single Side Band Suppressed Carrier) transmission.

DSB transmission is made while a carrier wave is suppressed, so that excellent power efficiency is obtained. However, DSB transmission needs an ideal band-pass filter for suppressing the carrier wave, and signal transmission of a direct-current component and a low-frequency component in the vicinity of a direct current becomes difficult. Ordinary AM modulation can deal with this, but needs a wide occupied frequency band. In addition, as with ordinary AM modulation, DSB transmission needs a bandwidth twice the bandwidth of a transmission object signal.

As with DSB transmission, SSB transmission is made while a carrier wave is suppressed, so that excellent power efficiency is obtained. In addition, SSB transmission needs only the same bandwidth as the bandwidth of a transmission object signal, but needs an ideal band-pass filter for passing only one side band.

There is VSB (Vestigial Side Band) transmission as a system corresponding to an intermediate between DSB transmission and SSB transmission. VSB transmission transmits a VSB signal obtained by leaving a small part of the spectrum of a side band to be erased in an AM-modulated high-frequency signal through a filter having a gentle cutoff characteristic around the carrier wave frequency, the gentle cutoff characteristic being obtained by making the cutoff frequency characteristic of the filter necessary for SSB transmission gentler. On the receiving side, the VSB signal is received using a VSB filter exhibiting a cutoff characteristic symmetric with respect to a point that is the part of the carrier frequency. Demodulation is performed in the same manner as in the SSB system. When the phase characteristic of the VSB filter is a linear characteristic, a component on the left side of the carrier wave is folded to a right and superimposed. Thus, a demodulated signal has a flat characteristic, and a correct signal can be reconstructed from the received signal. VSB transmission is said to be a system for achieving both the transmission of a direct-current component and a relatively narrow occupied frequency band.

A frequency arrangement in the frequency shift system according to the present embodiment resembles a frequency arrangement in VSB transmission at first glance. However, VSB transmission and the frequency shift system according to the present embodiment are different from each other in that VSB transmission demands a specific filter on both of a transmitting side and a receiving side, whereas the frequency shift system according to the present embodiment does not use anything corresponding to these filters. This is based on a fact that the present embodiment performs processing equivalent to filter processing for transmission and reception in VSB transmission by setting the use bands of the amplifying section 8117 on the transmitting side and the amplifying section 8224 on the receiving side (frequency shift).

In addition, VSB transmission uses all of a side band on one side of the carrier wave and a part (carrier wave side) of another side band for a purpose of ensuring transmission of information around a direct current while enhancing frequency use efficiency. On the other hand, the frequency shift system according to the present embodiment enables high-speed transmission by shifting the carrier frequency with respect to the center of a band (specifically a transmission band between transmission and reception: the band of the total frequency characteristic in the previous example). Thus, there are also differences in action and effect.

VSB transmission and the frequency shift system according to the present embodiment only appear to have similar frequency arrangements. VSB transmission does not include a technical concept of "shifting the carrier frequency with respect to the center of the transmission band between transmission and reception," which technical concept is employed by the frequency shift system according to the present embodiment.

<Electronic Devices and Transmission Line Structures>

First Example

FIGS. 12A to 12E are diagrams of assistance in explaining a first example of an electronic device according to the present embodiment and a transmission line structure applied to the electronic device. The first example is an example of application in a case where signal transmission is made by millimeter waves within a casing of one electronic device. In this example of application, the electronic device is an image pickup device including a solid-state image pickup device. Image pickup devices of this kind are distributed to the market as digital cameras, video cameras, or cameras of computer devices (Web cameras), for example.

The first example has a system configuration in which a first communicating device 100 is mounted on a main board on which a control circuit, an image processing circuit and the like are mounted, and a second communicating device 200 is mounted on an image pickup board on which the solid-state image pickup device is mounted. FIGS. 12A to 12E are schematic sectional views of the image pickup device 500 with attention directed to millimeter wave signal transmission between the boards. In FIGS. 12A to 12E, parts not related to millimeter wave signal transmission are omitted as appropriate.

The image pickup board 502 and the main board 602 are disposed within a casing 590 of the image pickup device 500. The solid-state image pickup device 505 is mounted on the image pickup board 502. For example, the solid-state image pickup device 505 corresponds to a CCD (Charge Coupled Device) having a driving section thereof (a horizontal driver and a vertical driver) also mounted on the image pickup board 502 or a CMOS (Complementary Metal Oxide Semiconductor) sensor.

The first communicating device 100 (semiconductor chip 103) is mounted on the main board 602 for making signal transmission between the main board 602 and the image pickup board 502 on which the solid-state image pickup device 505 is mounted, and the second communicating device 200 (semiconductor chip 203) is mounted on the image pickup board 502. Though not shown in the figures, the solid-state image pickup device 505 and an image pickup driving section are mounted on the image pickup board 502, and an image processing engine, an operating section, and various sensors are connected to the main board 602.

The solid-state image pickup device 505 and the image pickup driving section correspond to an application functional part of the LSI functional part 204 in the radio transmission system 1. The signal generating section 207 and the transmission line coupling section 208 are housed in the semiconductor chip 203 separate from the solid-state image pickup device 505, and are mounted on the image pickup board 502.

The image processing engine corresponds to an application functional part of the LSI functional part 104 in the radio transmission system 1, and accommodates an image processing section for processing an image pickup signal obtained in the solid-state image pickup device 505. The signal generating section 107 and the transmission line coupling section 108 are housed in the semiconductor chip 103 separate from the image processing engine, and are mounted on the main board 602.

Millimeter wave communication is performed between an antenna 136 and an antenna 236, whereby an image signal obtained in the solid-state image pickup device 505 is superimposed on a millimeter wave and transmitted to the main board 602 via a millimeter wave signal transmission line 9 between the antennas. Incidentally, as described above with reference to FIG. 1, the electronic device may be configured so as to be capable of bidirectional communication. For example, various control signals for controlling the solid-state image pickup device 505 are superimposed on a millimeter wave and transmitted to the image pickup board 502 via the millimeter wave signal transmission line 9 between the antennas.

FIGS. 12A to 12E show examples of the millimeter wave signal transmission line 9. In any of the examples, unlike radio communication in the open air, positional relation of each member in the image pickup device 500 to which intra-casing signal transmission is applied is determined to a certain degree, and therefore the transmission characteristic of the millimeter wave signal transmission line 9 can be easily calculated in advance.

Figure 12A:
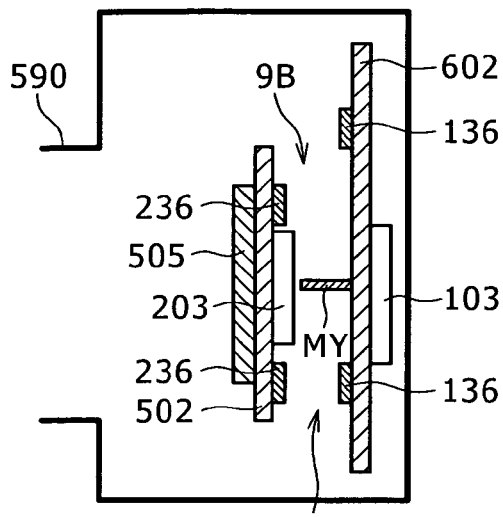
FIGS. 12A, 12B, 12C, 12D, and 12E are diagrams of assistance in explaining a first example of an electronic device and a transmission line structure.

In FIG. 12A, a free space transmission line 9B is used as the millimeter wave signal transmission line 9. A plurality of systems of the millimeter wave signal transmission line 9 are provided in proximity to each other. A structure for preventing radio wave propagation (millimeter wave shielding material MY) is disposed between the systems to suppress interference between antenna pairs of the respective systems.

Figure 12B:
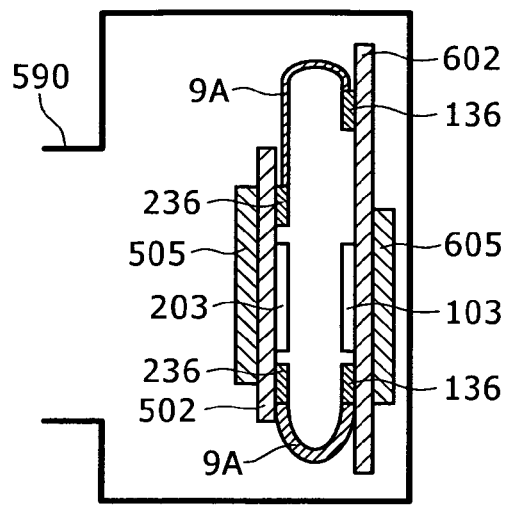
Figure 12C:
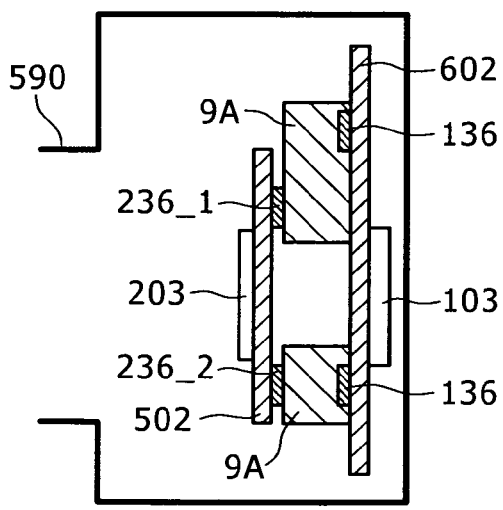

In FIGS. 12B and 12C, a dielectric transmission line 9A is used as the millimeter wave signal transmission line 9. In FIG. 12B, connection is established between the antenna 136 and the antenna 236 by a soft (flexible) dielectric material with a silicone resin base, for example, as the dielectric transmission line 9A. The periphery of the dielectric transmission line 9A may be surrounded by a shielding material (for example a conductor). In FIG. 12C, the dielectric transmission line 9A is fixed on the antenna 136 on the main board 602, and the antenna 236 of the image pickup board 502 is disposed in such a position as to be in contact with the dielectric transmission line 9A. Incidentally, the dielectric transmission line 9A may conversely be fixed on the side of the image pickup board 502.

Figure 12D:
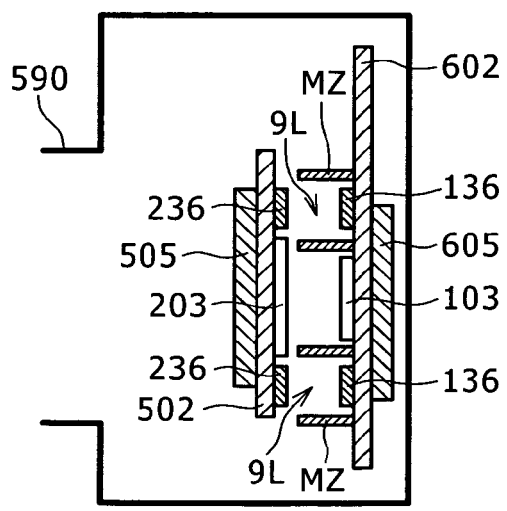
Figure 12E:
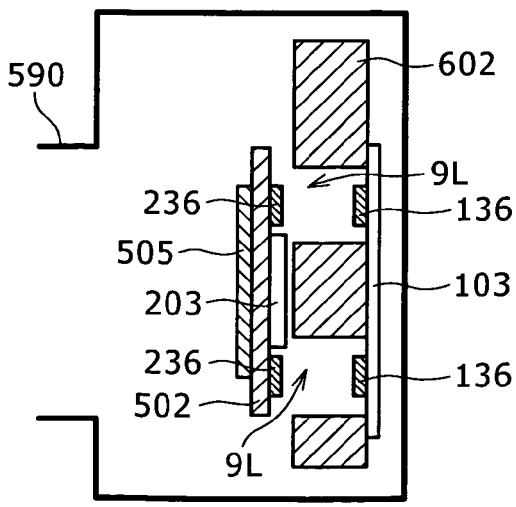

In FIGS. 12D and 12E, a hollow waveguide 9L of a structure whose periphery is surrounded by a shielding material and whose inside is hollow is used as the millimeter wave signal transmission line 9. In FIG. 12D, a hollow waveguide 9L of a structure whose periphery is surrounded by a conductor MZ as an example of a shielding material and whose inside is hollow is provided so as to enclose the antenna 136 on the main board 602. A moving center of the antenna 236 on the side of the image pickup board 502 is disposed in a position opposed to the antenna 136. The enclosure of the conductor MZ may be disposed on either of the side of the main board 602 and the side of the image pickup board 502. In FIG. 12E, a through hole or a non-through hole is provided in a relatively thick board, and a hollow waveguide 9L is provided with the wall surface of the hole used as an enclosure. In this case, the board functions as a shielding material. The hole may be in one of the image pickup board 502 and the main board 602, or may be in both of the image pickup board 502 and the main board 602.

When millimeter wave signal transmission is made with the first communicating device 100 and the second communicating device 200 disposed within the casing of one electronic device (image pickup device 500 in this example), in the case where the millimeter wave signal transmission line 9 is the free space transmission line 9B, there is a fear of effect of reflection by members within the casing. In the case of applying the injection locking system, in particular, transmission power is generally higher than in the case of not applying the same system, and thus interference and multipath problems caused by the reflection are expected to become manifest. On the other hand, when a millimeter wave signal transmission line 9 of a millimeter wave confining structure (waveguide structure) such as the dielectric transmission line 9A, the hollow waveguide 9L or the like is used, effect of reflection by members within the casing is not produced. Therefore the characteristic of the millimeter wave signal transmission line 9 can be determined easily. In addition, because a millimeter wave signal emitted from the antenna 136 can be transmitted to the antenna 236 side in a state of being confined in the millimeter wave signal transmission line 9, a waste of emitted radio waves is reduced. Thus, transmission power can be decreased even in the case of applying the injection locking system.

Second Example

Figure 13A:
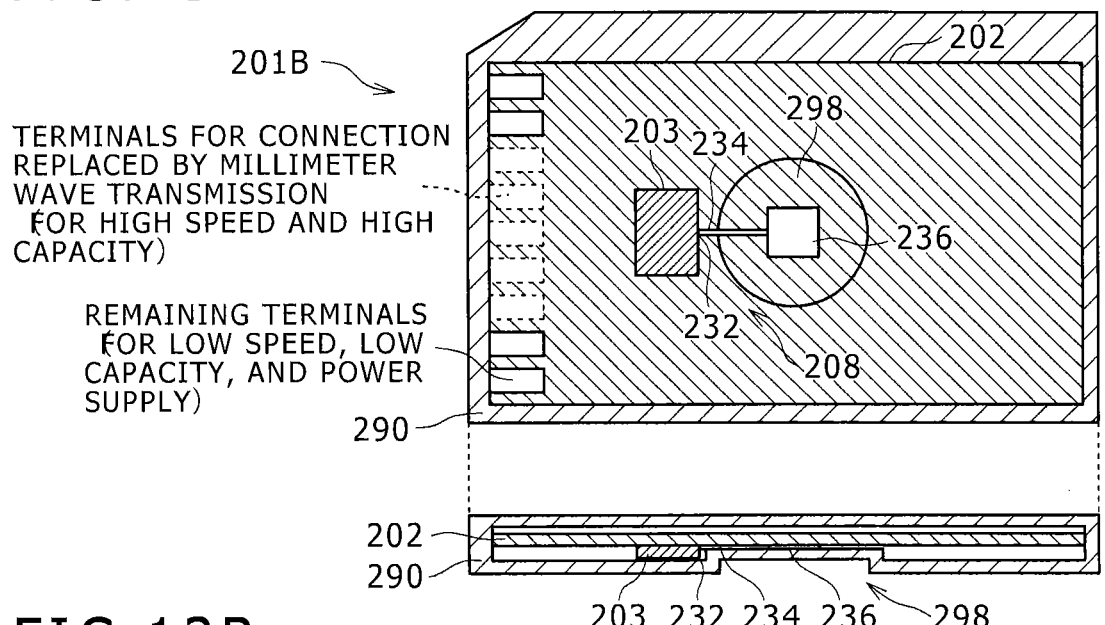
FIGS. 13A, 13B, and 13C are diagrams of assistance in explaining a second example of the electronic device and the transmission line structure.
Figure 13B:
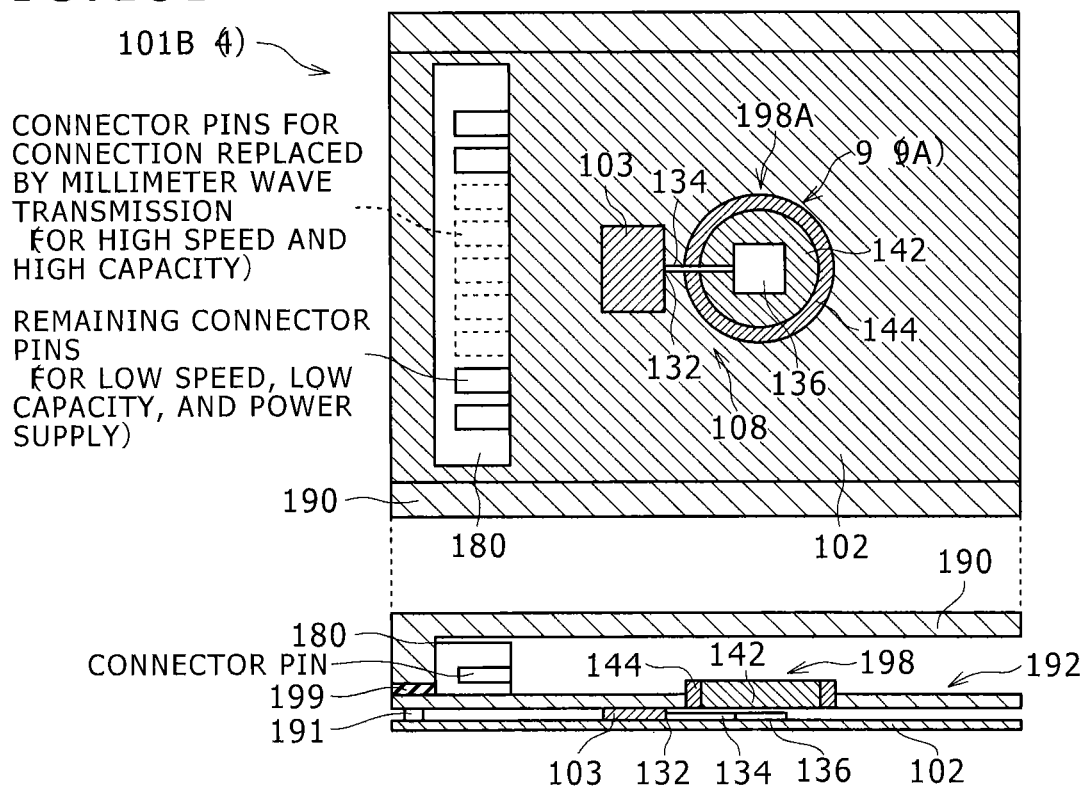
Figure 13C:

FIGS. 13A to 13C are diagrams of assistance in explaining a second example of an electronic device according to the present embodiment and a transmission line structure applied to the electronic device. The second example is an example of application in a case where signal transmission is made by millimeter waves between a plurality of electronic devices set in an integral state. Application is made particularly to signal transmission between two electronic devices when one electronic device is mounted in the other electronic device.

There is for example a system in which a card type information processing device typified by a so-called IC card or a memory card including a central processing unit (CPU), a nonvolatile storage device (for example a flash memory) and the like is mountable (detachable) in an electronic device on a main unit side. The card type information processing device as an example of one (first) electronic device will hereinafter be also referred to as a "card type device." The other (second) electronic device on the main unit side will hereinafter be also referred to simply as an electronic device.

A slot structure 4 between an electronic device 101B and a memory card 201B is a structure for inserting and removing the memory card 201B into and from the electronic device 101B, and has a function of a section for fixing the electronic device 101B and the memory card 201B.

FIG. 13A shows an example of structure (plane perspective and sectional perspective) of the memory card 201B. FIG. 13B shows an example of structure (plane perspective and sectional perspective) of the electronic device 101B. FIG. 13C shows an example of structure (sectional perspective) when the memory card 201B is inserted in the slot structure 4 (opening 192 in particular) of the electronic device 101B.

The slot structure 4 has a configuration such that the memory card 201B (casing 290 of the memory card 201B) can be inserted into the casing 190 of the electronic device 101B from the opening 192 and removed from the casing 190 of the electronic device 101B, and can be fixed to the casing 190 of the electronic device 101B. A board 102 is attached to one surface of the casing 190 on an opposite side from the opening 192 by a support 191. A connector on a receiving side is provided in a position of contact with terminals of the memory card 201B in the slot structure 4. Connector terminals (connector pins) are not necessary for signals to be transmitted by millimeter waves.

As shown in FIG. 13A, the casing 290 of the memory card 201B has a cylindrical depression shape configuration 298 (hollow). As shown in FIG. 13B, the casing 190 of the electronic device 101B has a cylindrical projection shape configuration 198 (protrusion).

The memory card 201B has a semiconductor chip 203 including a signal generating section 207 on one surface of a board 202. The semiconductor chip 203 is provided with a millimeter wave transmitting and receiving terminal 232 for coupling to a millimeter wave signal transmission line 9. A millimeter wave transmission line 234 made of a board pattern connected to the millimeter wave transmitting and receiving terminal 232 and an antenna 236 (patch antenna in FIG. 13A) are formed on one surface of the board 202. The millimeter wave transmitting and receiving terminal 232, the millimeter wave transmission line 234, and the antenna 236 form a transmission line coupling section 208. The casing 290 has the depression shape configuration 298 in the same surface as the antenna 236. The part of the depression shape configuration 298 is formed by a dielectric resin including a dielectric material allowing millimeter wave signal transmission.

A connecting terminal 180 for being connected to the electronic device 101B at a determined position of the casing 290 is disposed at the determined position of the casing 290 at one side of the board 202. The memory card 201B includes, in a part thereof, an existing terminal structure for low-speed and low-capacity signals and for power supply. A clock signal and a plurality of data signals are objects for signal transmission by the millimeter wave, and thus terminals therefor are removed, as indicated by dotted lines in FIG. 13A.

As shown in FIG. 13B, the electronic device 101B has a semiconductor chip 103 including a signal generating section 107 on one surface on the opening part 192 side of the board 102. The semiconductor chip 103 is provided with a millimeter wave transmitting and receiving terminal 132 for coupling to the millimeter wave signal transmission line 9. A millimeter wave transmission line 134 made of a board pattern connected to the millimeter wave transmitting and receiving terminal 132 and an antenna 136 (patch antenna in FIG. 13B) are formed on one surface of the board 102. The millimeter wave transmitting and receiving terminal 132, the millimeter wave transmission line 134, and the antenna 136 form a transmission line coupling section 108.

The opening part 192 into and from which the memory card 201B is inserted and removed is formed as the slot structure 4 in the casing 190. The casing 190 has the projection shape configuration 198 formed so as to constitute the millimeter wave signal transmission line 9 having a millimeter wave confining structure (waveguide structure) in the part corresponding to the position of the depression shape configuration 298 when the memory card 201B is inserted in the opening part 192. The projection shape configuration 198 is configured to be a dielectric transmission line 9A by forming a dielectric waveguide 142 whose inside is filled with a dielectric material within a tubular conductor 144. The projection shape configuration 198 is fixedly disposed such that the center of the dielectric waveguide 142 coincides with the antenna 136 of the transmission line coupling section 108. The dielectric waveguide 142 is provided as a structure for strengthening coupling between the antenna 136 and the antenna 236 in the projection and depression fitting structure.

The diameter of the conductor 144 is made to correspond to the diameter of the depression shape configuration 298 of the memory card 201B. The conductor 144 also has an effect of a shielding material for suppressing external radiation of a millimeter wave transmitted within the dielectric waveguide 142.

As shown in FIG. 13C, the casing 190 of the slot structure 4 has a mechanical structure such that the projection shape configuration 198 (dielectric transmission line 9A) and the depression shape configuration 298 come into contact with each other in the form of a projection and a depression when the memory card 201B is inserted from the opening part 192 into the casing 190 of the slot structure 4. When the projection and depression structures are fitted to each other, the antenna 136 and the antenna 236 are opposed to each other, and the dielectric transmission line 9A is disposed as the millimeter wave signal transmission line 9 between the antenna 136 and the antenna 236.

A constitution is employed in which when the memory card 201B is mounted in the slot structure 4, the memory card 201B and the slot structure 4 are fixed to each other, and the dielectric transmission line 9A including the dielectric waveguide 142 is interposed between the transmission line coupling section 108 and the transmission line coupling section 208 (the antenna 136 and the antenna 236 in particular). In addition, the alignment of the dielectric transmission line 9A for coupling of millimeter wave transmission is achieved so as to transmit millimeter wave signals efficiently between the antenna 136 and the antenna 236. Excellent millimeter wave transmission characteristics between the transmission line coupling section 108 and the transmission line coupling section 208 are obtained when the projection and the depression are matched. The efficiency of high-speed signal transmission can be improved by confining the millimeter wave signals in the dielectric transmission line 9A. Although the casing 290 of the memory card 201B is interposed between the dielectric transmission line 9A and the antenna 236, the material of the part of the depression shape configuration 298 is a dielectric material, and thus does not produce a great effect on millimeter wave transmission.

Because the dielectric transmission line 9A of the millimeter wave confining structure is constructed by using the slot structure 4, effect of reflection by the casings or other members is not produced, and a millimeter wave signal emitted from the antenna 136 can be transmitted to the antenna 236 side in a state of being confined in the dielectric transmission line 9A. Therefore, a waste of emitted radio waves is reduced. Thus, transmission power can be decreased even in the case of applying the injection locking system.

In inter-device signal transmission in a state of the memory card 201B being mounted in the electronic device 101B and thus the memory card 201B and the electronic device 101B being integral with each other, the positional relation of each member is determined by the projection and depression fitting structure unlike radio communication in the open air. Thus, the transmission characteristic of the dielectric transmission line 9A can be easily calculated in advance.

Third Example

Figure 14A:
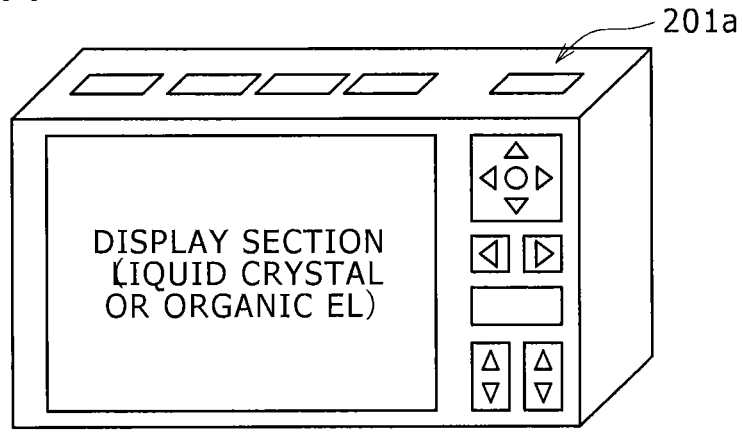
FIGS. 14A, 14B, and 14C are diagrams of assistance in explaining a third example of the electronic device and the transmission line structure.
Figure 14B:
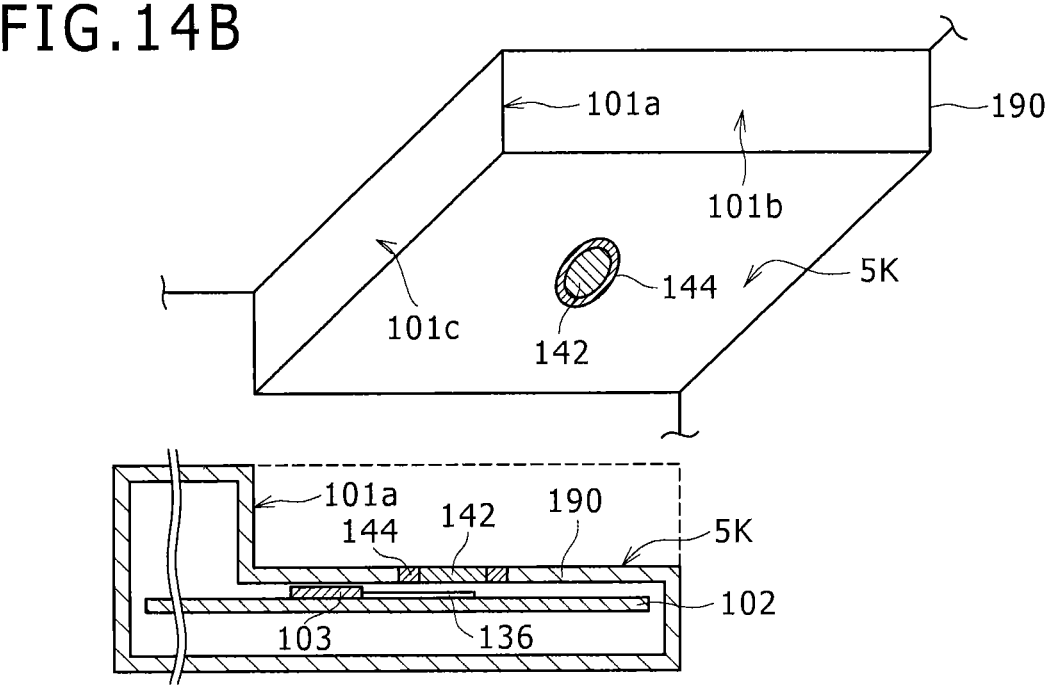
Figure 14C:
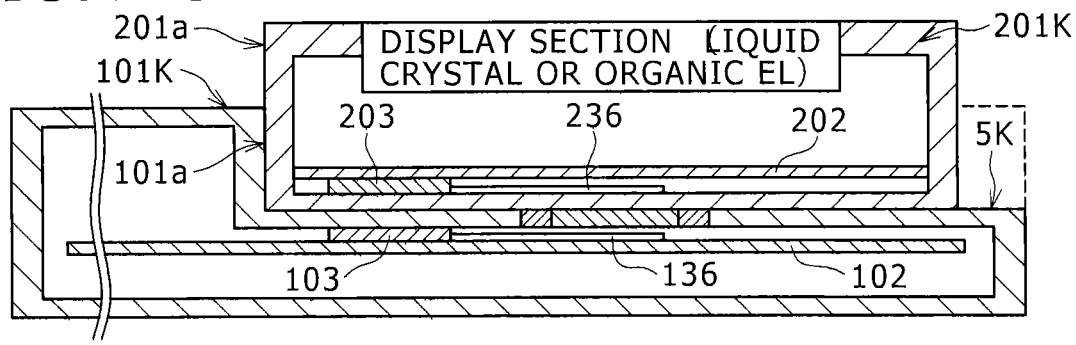

FIGS. 14A to 14C are diagrams of assistance in explaining a third example of an electronic device according to the present embodiment and a transmission line structure applied to the electronic device, and is of assistance in explaining an example of modification of the electronic device in particular. A radio transmission system 1 includes a portable type image reproducing device 201K as an example of a first electronic device, and includes an image obtaining device 101K as an example of a second (main unit side) electronic device in which to mount the image reproducing device 201K. The image obtaining device 101K has a mounting base 5K to be mounted with the image reproducing device 201K as a part of a casing 190. Incidentally, a slot structure 4 as in the second example may be used in place of the mounting base 5K. The third example is the same as the second example in that signal transmission is made by radio in the millimeter wave band between two electronic devices when one electronic device is mounted in the other electronic device. Description in the following will be made with attention directed to differences from the second example.

The image obtaining device 101K has substantially the shape of a rectangular parallelepiped (box shape), and can no longer be said to be a card type. It suffices for the image obtaining device 101K to obtain moving image data, for example. A digital recording and reproducing device or a terrestrial television receiver, for example, corresponds to the image obtaining device 101K. The image reproducing device 201K includes, as an application functional part 204, a storage device for storing moving image data transmitted from the side of the image obtaining device 101K and a functional part for reading moving image data from the storage device and reproducing a moving image on a display section (for example a liquid crystal display device or an organic EL display device). It suffices to consider from a structural viewpoint that the memory card 201B is replaced with the image reproducing device 201K and that the electronic device 101B is replaced with the image obtaining device 101K.

As in the second example of the millimeter wave transmission line structure (FIG. 13A to 13C), for example, a semiconductor chip 103 is housed within the casing 190 as a lower part of the mounting base 5K, and an antenna 136 is provided at a certain position within the casing 190. A dielectric waveguide 142 whose internal transmission line is a dielectric transmission line 9A formed by a dielectric material and whose outside is surrounded by a conductor 144 is provided in a part of the casing 190 which part is opposed to the antenna 136.

As in the second example of the millimeter wave transmission line structure (FIG. 13A to 13C), for example, a semiconductor chip 203 is housed within the casing 290 of the image reproducing device 201K mounted on the mounting base 5K, and an antenna 236 is provided at a certain position within the casing 290. A millimeter wave signal transmission line 9 (dielectric transmission line 9A) is formed by a dielectric material in a part of the casing 290 which part is opposed to the antenna 236. These points are similar to those of the foregoing second example.

Such a constitution makes it possible to perform alignment for millimeter wave signal transmission of the image reproducing device 201K at the time of placing (mounting) the image reproducing device 201K in the mounting base 5K. Although the casing 190 and the casing 290 are interposed between the antenna 136 and the antenna 236, the casing 190 and the casing 290 are a dielectric material, and thus do not greatly affect millimeter wave transmission.

The third example adopts a wall surface butting system rather than the concept of a fitting structure. The antenna 136 and the antenna 236 are opposed to each other when the image reproducing device 201K is placed so as to be butted against a corner 101a of the mounting base 5K. Thus effects of positional displacement can be surely eliminated.

A constitution is employed in which when the image reproducing device 201K is mounted at the specified position of the mounting base 5K, the dielectric transmission line 9A is interposed between the transmission line coupling section 108 and the transmission line coupling section 208 (the antenna 136 and the antenna 236 in particular). The efficiency of high-speed signal transmission can be improved by confining millimeter wave signals in the dielectric transmission line 9A. Effect of reflection by the casings or other members is not produced, and a millimeter wave signal emitted from the antenna 136 can be transmitted to the antenna 236 side in a state of being confined in the dielectric transmission line 9A. Therefore, a waste of emitted radio waves is reduced. Thus, transmission power can be decreased even in the case of applying the injection locking system.

In inter-device signal transmission in a state of the image reproducing device 201K being mounted in the image obtaining device 101K and thus the image reproducing device 201K and the image obtaining device 101K being integral with each other, the positional relation of each member is determined to a certain degree unlike radio communication in the open air. Thus, the transmission characteristic of the millimeter wave signal transmission line 9 can be easily calculated in advance.

[Relation to Total Frequency Characteristic]

The electronic devices in the first to third examples to which the radio transmission system 1 according to the present embodiment is applied make signal transmission by the millimeter wave rather than electric wiring. A signal to be transmitted from the LSI functional part 104 to the LSI functional part 204 is converted into a millimeter wave signal. The millimeter wave signal is transmitted through the millimeter wave signal transmission line 9 between the transmission line coupling section 108 and the transmission line coupling section 208.

Because of radio transmission, it is not necessary to care about the shape of wiring and the position of connectors, and thus there occurs no particular limitation on layout. Signals transmitted by the millimeter wave have short wavelength and a limited wavelength range, so that the problems of EMC and EMI can be solved easily. Generally, there is no other functional part using frequencies in the millimeter wave band within the first communicating device 100 and the second communicating device 200, and therefore measures against EMC and EMI can be realized easily.

Because radio transmission is performed in a state of the first communicating device 100 and the second communicating device 200 being in proximity to each other, and signal transmission is performed between fixed positions and in known positional relation, the following advantages are obtained.

1) It is easy to properly design a propagation channel (waveguide structure) between the transmitting side and the receiving side.

2) Excellent transmission with higher reliability than free space transmission is made possible by designing the dielectric structure of the transmission line coupling sections sealing the space between the transmitting side and the receiving side and the propagation channel (waveguide structure of the millimeter wave signal transmission line 9) in conjunction with each other.

3) The control of a controller for managing radio transmission (the LSI functional part 104 and the LSI functional part 204 in the present example) does not need to be performed dynamically or adaptively with high frequency unlike ordinary radio communication, so that control overhead can be reduced as compared with ordinary radio communication. As a result, miniaturization, lower power consumption, and higher speed can be achieved.

4) When a radio transmission environment is calibrated at a time of manufacturing or at a time of design, and individual variations and the like are grasped, communication of higher quality is made possible by referring to the data and making transmission.

5) Even when reflection is present within a device or between devices, the reflection is a fixed reflection, so that effects of the reflection can be easily eliminated by a small equalizer on the receiving side. A setting of the equalizer can be made by a preset or static control, and can thus be attained easily.

In addition, radio communication in the millimeter wave band of short wavelengths provides the following advantages.

a) Because a wide band can be obtained by millimeter waves, a high data rate can be achieved easily.

b) Frequencies used for transmission can be separated from frequencies of other baseband signal processing. Thus, frequency interference between a millimeter wave and a baseband signal do not occur easily.

c) Because the millimeter wave band has short wavelengths, the antenna and the waveguide structure determined according to wavelength can be miniaturized. In addition, because of great distance attenuation and a little diffraction of the millimeter wave band, electromagnetic shielding is provided easily.

d) There are strict regulations for ordinary radio communication in the open air in regard to the stability of carrier waves to prevent interference and the like. In order to realize a carrier wave of such high stability, an external frequency reference part of high stability, a multiplying circuit, a PLL (phase-locked loop circuit) and the like are used, thus increasing circuit scale. However, with the millimeter wave (especially when used in conjunction with signal transmission between fixed positions or in known positional relation), it is possible to shield the millimeter wave easily, prevent a leakage of the millimeter wave to the outside, use a carrier wave of low stability for transmission, and thus prevent an increase in circuit scale. An injection locking system is suitably adopted to demodulate a signal transmitted by a carrier wave of relaxed stability by a small circuit on the receiving side.

In the foregoing description of simulation analysis for the frequency shift system according to the present embodiment, the frequency characteristics of the millimeter wave signal transmission line 9 are assumed to be flat within the range of a transmission band. In practice, however, the frequency characteristics of the millimeter wave signal transmission line 9 are also affected. Even in this case, as is understood from the foregoing description, the positional relation of each member is determined to a certain degree in intra-casing signal transmission (for example the first example of the electronic device) and inter-device signal transmission in a state of a plurality of electronic devices being integral with each other (for example the second example and the third example of the electronic device), unlike radio communication in the open air. Therefore the transmission characteristics of the millimeter wave signal transmission line 9 can be easily determined (calculated) in advance.

Thus, the frequency shift system according to the present embodiment that shifts the carrier wave frequency with respect to the center of the band of a transmission characteristic between transmission and reception (total communication characteristic) can be applied to the transmission characteristic between transmission and reception (total communication characteristic) after the characteristics of the millimeter wave signal transmission line 9 are taken into account. In some cases, by making the millimeter wave signal transmission line 9 function also as a waveform equalizer on the output side of the amplifying section 8117 or on the input side of the amplifying section 8224, it is possible to widen (or narrow) the bandwidth of the transmitting system and the receiving system, and in relation to this effect, adjust a degree of shift in the carrier wave frequency with respect to the center of the band.

In addition, use of the millimeter wave signal transmission line 9 of a millimeter wave confining structure (waveguide structure) such as the dielectric transmission line 9A, the hollow waveguide 9L or the like makes it possible to lower transmission power, and can therefore contribute to a wider band of the amplifying section 8117 and the amplifying section 8224 (that is, higher-speed transmission).

While the present invention has been described above using embodiments thereof, the technical scope of the present invention is not limited to the scope described in the foregoing embodiments. Various changes and improvements can be added to the foregoing embodiments without departing from the spirit of the invention, and forms obtained by adding such changes and improvements are also included in the technical scope of the present invention.

In addition, the foregoing embodiments do not limit inventions of claims, and not all combinations of features described in the embodiments are necessarily essential to solving means of the invention. The foregoing embodiments include inventions in various stages, and various inventions can be extracted by appropriately combining a plurality of disclosed constitutional demands. Even when a few constitutional demands are omitted from all the constitutional demands disclosed in the embodiments, constitutions resulting from the omission of the few constitutional demands can be extracted as inventions as long as an effect is obtained.

In the foregoing embodiments, the frequency shift system is applied to intra-casing signal transmission (for example the first example of the electronic device) and inter-device signal transmission (for example the second example and the third example of the electronic device). However, the scope of the application is not limited to these examples. The frequency shift system is also applicable to radio communication in the open air.

In the foregoing embodiments, a system in which communication is performed in the millimeter wave band has been illustrated as an example of the radio transmission system. However, the range of application of the radio transmission system is not limited to systems in which communication is performed in the millimeter wave band. Centimeter waves having longer wavelength than the millimeter wave band (desirably on a side close to millimeter waves) or conversely submillimeter waves having shorter wavelength than the millimeter wave band (desirably on a side close to millimeter waves) may be applied.

The image pickup device 500 to which intra-casing signal transmission is applied or the combination of the electronic device 101B and the memory card 201B or the combination of the image obtaining device 101K and the image reproducing device 201K to which inter-device signal transmission is applied has been illustrated as an example of the electronic device. However, the electronic device is not limited to these examples. The electronic device is not limited to devices in a specific field as long as the electronic device includes the function of the frequency shift described in the foregoing embodiments. For example, a television receiver, an audio reproducing device as a portable terminal device, a game machine, an electronic book, an electronic dictionary and the like are assumed.

The present application contains subject matter related to that disclosed in Japanese Priority Patent Application JP 2010-027137 filed in the Japan Patent Office on Feb. 10, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmission system comprising:
   a transmitting side local oscillating section configured to generate a carrier signal at a carrier wave frequency, a carrier frequency band being a frequency band of the carrier signal;
   a modulation section configured to modulate a data signal into a modulated signal;
   a frequency section configured to frequency convert the modulated signal from a baseband to the carrier frequency band to generate an electric signal;
   an amplifying section configured to amplify said electric signal, an amplified signal being said electric signal that has been amplified, the amplifying section having a use band set to shift the center of the band of said amplified signal, thus creating an asymmetry of the band of said amplified signal with respect to said carrier wave frequency; and
   a transmission medium receiving said amplified signal and propagating said amplified signal, wherein a transmission characteristic of said transmission medium is calculated in advance,
   wherein said amount of said shift to the center of the band of said amplified signal is dependent upon said transmission characteristic of said transmission medium calculated in advance.

2. The signal transmission system according to claim 1, wherein said carrier frequency band differs from said band of said amplified signal.

3. The signal transmission system according to claim 1, wherein a center frequency of the carrier frequency band differs from a center frequency of a transmission frequency band.

4. The signal transmission system according to claim 1, wherein said carrier wave frequency is a frequency from the group consisting of a millimeter wave band and a submillimeter wave band.

5. The signal transmission system according to claim 1, further comprising:
   a demodulation signal generating section configured to demodulate an object signal from a transmission signal, said transmission signal being said amplified signal that has been output from said transmission medium.

6. The signal transmission system according to claim 5, wherein a demodulated signal is said object signal that has been demodulated from said transmission signal.

7. The signal transmission system according to claim 6, wherein said demodulation signal generating section is configured to synchronize said demodulated signal with said modulated signal.

8. The signal transmission system according to claim 6, wherein a frequency of the demodulated signal is a frequency from the group consisting of a millimeter wave band and a submillimeter wave band.

9. The signal transmission system according to claim 6, wherein a center frequency of the demodulated signal is other than said carrier wave frequency.

10. The signal transmission system according to claim 9, wherein said demodulation signal generating section is configured to perform a demodulated signal transformation by frequency converting said transmission signal to said baseband.

11. The signal transmission system according to claim 10, wherein subsequent to said demodulated signal transformation, said center frequency of the demodulated signal is at said carrier wave frequency.

12. The signal transmission system according to claim 6, wherein said demodulation signal generating section is configured to output an injection locking signal.

13. The signal transmission system according to claim 12, further comprising:
   a reference carrier signal processing section configured to adjust a phase and amplitude of the modulated signal, said phase and amplitude being adjusted in relation to said injection locking signal.

14. The signal transmission system according to claim 6, further comprising:
   a casing, said demodulation signal generating section and said transmission medium being housed within said casing.

15. The signal transmission system according to claim 14, further comprising:
   a transmission line within said casing, said amplified signal being transmissible over said transmission line.

* * * * *